(12) United States Patent
Kanegae et al.

(10) Patent No.: US 7,680,002 B2
(45) Date of Patent: Mar. 16, 2010

(54) INFORMATION RECORDING MEDIUM, INFORMATION RECORDING APPARATUS AND METHOD, INFORMATION REPRODUCING APPARATUS AND METHOD, INFORMATION RECORDING/REPRODUCING APPARATUS AND METHOD, RECORDING OR REPRODUCTION CONTROL COMPUTER PROGRAM, AND DATA STRUCTURE CONTAINING CONTROL SIGNAL

(75) Inventors: Tohru Kanegae, Saitama (JP); Masanori Nakahara, Saitama (JP); Takeshi Koda, Saitama (JP); Yasuko Fukuda, Saitama (JP); Takao Sawabe, Saitama (JP); Nobuyuki Takakuwa, Saitama (JP); Akira Imamura, Saitama (JP)

(73) Assignee: Pioneer Corporation, Tokyo (JP)

( * ) Notice: Subject to any disclaimer, the term of this patent is extended or adjusted under 35 U.S.C. 154(b) by 1333 days.

(21) Appl. No.: 10/501,383

(22) PCT Filed: Jan. 20, 2003

(86) PCT No.: PCT/JP03/00430

§ 371 (c)(1),
(2), (4) Date: Jan. 28, 2005

(87) PCT Pub. No.: WO03/063479

PCT Pub. Date: Jul. 31, 2003

(65) Prior Publication Data

US 2005/0120049 A1    Jun. 2, 2005

(30) Foreign Application Priority Data

Jan. 18, 2002  (JP)  ............................ 2002-009632

(51) Int. Cl.
G11B 7/085 (2006.01)
(52) U.S. Cl. ................................................. 369/30.03
(58) Field of Classification Search .................... None
See application file for complete search history.

(56) References Cited

U.S. PATENT DOCUMENTS

| 5,907,658 | A | 5/1999 | Murase et al. |
|---|---|---|---|
| 5,913,010 | A | 6/1999 | Kaneshige et al. |
| 6,009,234 | A | 12/1999 | Taira et al. |
| 6,445,877 | B1 | 9/2002 | Okada et al. |
| 6,839,059 | B1 * | 1/2005 | Anderson et al. ........... 345/501 |
| 6,985,411 | B2 * | 1/2006 | Kanegae et al. .......... 369/30.04 |
| 2002/0164152 | A1 * | 11/2002 | Kato et al. .................... 386/95 |

(Continued)

FOREIGN PATENT DOCUMENTS

JP    10-50034    2/1998

(Continued)

*Primary Examiner*—Joseph H Feild
*Assistant Examiner*—Henok G Heyi
(74) *Attorney, Agent, or Firm*—Young & Thompson

(57) ABSTRACT

An information recording medium includes an object data file for storing object data as a series of content information such as video information and audio information and play list information file for storing play list information defining a reproduction sequence on play list basis. Furthermore, the medium includes a disc information file for storing a plurality of title play lists each containing information specifying play list information defining a play list to be reproduced, pre-command information and post-command information specifying commands to be executed before and after a reproduction, respectively, according to the play list information.

8 Claims, 21 Drawing Sheets

U.S. PATENT DOCUMENTS

2002/0177914 A1 * 11/2002 Chase .................. 700/94

FOREIGN PATENT DOCUMENTS

| JP | 10-92159 | 4/1998 |
| JP | 11-215471 | 8/1999 |
| JP | 2000-268537 | 9/2000 |
| JP | 2001-103417 | 4/2001 |
| JP | 2001-143269 | 5/2001 |
| JP | 2001-250337 | 9/2001 |
| JP | 2001-312880 | 11/2001 |
| JP | 2001-351312 | 12/2001 |
| JP | 2003-022658 | 1/2003 |

* cited by examiner

FIG. 17

| FIELD NAME | | | DESCRIPTION CONTENTS |
|---|---|---|---|
| DISC COMPREHENSIVE INFORMATION | | | DISC VOLUME INFORMATION, TOTAL TITLE NUMBER etc. |
| TITLE INFO. TABLE | TITLE POINTER | | STORING ADDRESS OF TITLE #1 INFO., OTHER INFO. ABOUT TITLE #1, such as TITLE TYPE |
| | | | STORING ADDRESS OF TITLE #2 INFO., OTHER INFO. ABOUT TITLE #1, such as TITLE TYPE |
| | | | -------- |
| | TITLE #1 INFO. | TITLE P LIST #1 | P LIST NUMBER SPECIFIED BY TITLE P LIST #1 (THE FIRST TITLE P LIST OF TITLE #1) ( : P LIST NUMBER IN P LIST INFORMATION FILE), PRE COMMAND Table OF TITLE P LIST #1, POST COMMAND Table OF TITLE P LIST #1, OTHER INFO. ABOUT TITLE P LIST #1 |
| | | TITLE P LIST #2 | P LIST NUMBER SPECIFIED BY TITLE P LIST #2 ( : P LIST NUMBER IN P LIST INFORMATION FILE), PRE COMMAND Table OF TITLE P LIST #2, POST COMMAND Table OF TITLE P LIST #2, OTHER INFO. ABOUT TITLE P LIST #2 |
| | | | ---------------------- |
| | TITLE #2 INFO. | TITLE P LIST #1 | P LIST NUMBER SPECIFIED BY TITLE P LIST #1 (THE FIRST TITLE P LIST OF TITLE #2) ( : P LIST NUMBER IN P LIST INFORMATION FILE), PRE COMMAND Table OF TITLE P LIST #1, POST COMMAND Table OF TITLE P LIST #1, OTHER INFO. ABOUT TITLE P LIST #1 |
| | | | ---------------------- |
| | ---------------------- | | |
| OTHER INFORMATION | | | |

FIG. 18

| FIELD NAME | | | DESCRIPTION CONTENTS |
|---|---|---|---|
| DISC COMPREHENSIVE INFORMATION | | | DISC VOLUME INFORMATION (THE CONTENT THEREOF IS OMITTED) THE TOTAL NUMBER OF TITLES =3, OTHER INFORMATION |
| TITLE INFO. table | TITLE POINTER | | STORING ADDRESS OF TITLE #1 INFO., TITLE TYPE=One TITLE P LIST TYPE、 THE TOTAL NUMBER OF P LIST INFO.=1、OTHER INFO. ABOUT TITLE #1 |
| | | | STORING ADDRESS OF TITLE #2 INFO., TITLE TYPE=SEQUENTIAL TYPE、 THE TOTAL NUMBER OF P LIST INFO.=3、OTHER INFO. ABOUT TITLE #2 |
| | | | STORING ADDRESS OF TITLE #3 INFO., TITLE TYPE=BRANCH TYPE、 THE TOTAL NUMBER OF P LIST INFO.=6、OTHER INFO. ABOUT TITLE #3 |
| | TITLE #1 INFO. | TITLE P LIST #1 | P LIST NUMBER SPECIFIED BY TITLE P LIST #1=1, Pre COMMAND TABLE OF TITLE P LIST #1, Post COMMAND TABLE OF TITLE P LIST #1 OTHER INFO. ABOUT TITLE P LIST #1 |
| | TITLE #2 INFO. | TITLE P LIST #1 | P LIST NUMBER SPECIFIED BY TITLE P LIST #1=2, Pre COMMAND TABLE OF TITLE P LIST #1, Post COMMAND TABLE OF TITLE P LIST #1 OTHER INFO. ABOUT TITLE P LIST #1 |
| | | TITLE P LIST #2 | P LIST NUMBER SPECIFIED BY TITLE P LIST #2=1, Pre COMMAND TABLE OF TITLE P LIST #2, Post COMMAND TABLE OF TITLE P LIST #2 OTHER INFO. ABOUT TITLE P LIST #2 |
| | | TITLE P LIST #3 | P LIST NUMBER SPECIFIED BY TITLE P LIST #3=3, Pre COMMAND TABLE OF TITLE P LIST #3, Post COMMAND TABLE OF TITLE P LIST #3 OTHER INFO. ABOUT TITLE P LIST #3 |
| | TITLE #3 INFO. | TITLE P LIST #1 | P LIST NUMBER SPECIFIED BY TITLE P LIST #1=1, Pre COMMAND TABLE OF TITLE P LIST #1, Post COMMAND TABLE OF TITLE P LIST #1 OTHER INFO. ABOUT TITLE P LIST #1 |
| | | TITLE P LIST #2 | P LIST NUMBER SPECIFIED BY TITLE P LIST #2=3, Pre COMMAND TABLE OF TITLE P LIST #2, Post COMMAND TABLE OF TITLE P LIST #2. OTHER INFO. ABOUT TITLE P LIST #2 |
| | | TITLE P LIST #3 | P LIST NUMBER SPECIFIED BY TITLE P LIST #3=2, Pre COMMAND TABLE OF TITLE P LIST #3, POST COMMAND TABLE OF TITLE P LIST #3 OTHER INFO. ABOUT TITLE P LIST #3 |
| | | TITLE P LIST #4 | P LIST NUMBER SPECIFIED BY TITLE P LIST #4=1, Pre COMMAND TABLE OF TITLE P LIST #4, Post COMMAND TABLE OF TITLE P LIST #4 OTHER INFO. ABOUT TITLE P LIST #4 |
| | | TITLE P LIST #5 | P LIST NUMBER SPECIFIED BY TITLE P LIST #5=4, Pre COMMAND TABLE OF TITLE P LIST #5, Post COMMAND TABLE OF TITLE P LIST #5 OTHER INFO. ABOUT TITLE P LIST #5 |
| | | TITLE P LIST #6 | P LIST NUMBER SPECIFIED BY TITLE P LIST #6=2, Pre COMMAND TABLE OF TITLE P LIST #6, Post COMMAND TABLE OF TITLE P LIST #6 OTHER INFO. ABOUT TITLE P LIST #6 |
| OTHER INFORMATION | | | |

FIG. 19

| FIELD NAME | DESCRIPTION CONTENTS | REMARKS |
|---|---|---|
| COMMAND POINTER | Pre COMMAND Table START ADDRESS | RELATIVE ADDRESS |
| | THE TOTAL Pre COMMAND NUMBER | |
| | Post COMMAND Table START ADDRESS | RELATIVE ADDRESS |
| | THE TOTAL Post COMMAND NUMBER | |
| | OTHER INFORMATION | |
| Pre COMMAND Table | Pre COMMAND #1 (COMMAND CONTENTS) | STATEMENTS ARE WRITTEN |
| | Pre COMMAND #2 | |
| | ---------------- | 116 |
| Post COMMAND Table | Post COMMAND #1 | 117 |
| | Post COMMAND #2 | |
| | ---------------- | |

FIG. 20

| FIELD NAME | | | DESCRIPTION CONTENTS |
|---|---|---|---|
| P LIST COMPREHENSIVE INFO. | | | P LIST SIZE THE TOTAL NUMBER OF P LISTS =4、 OTHER INFO. |
| P LIST POINTER table | P LIST #1 POINTER | | STORING ADDRESS OF P LIST #1 INFO. |
| | P LIST #2 POINTER | | STORING ADDRESS OF P LIST #2 INFO. |
| | P LIST #3 POINTER | | STORING ADDRESS OF P LIST #3 INFO. |
| | P LIST #4 POINTER | | STORING ADDRESS OF P LIST #4 INFO. |
| P LIST #1 INFORMATION table | P LIST #1 COMPREHENSIVE INFORMATION | | THE TOTAL NUMBER OF CONSTITUENT ITEMS=3, OTHER INFORMATION |
| | P LIST #1 ITEM INFO. table | ITEM #1 INFO. | APPROPRIATE AU NUMBER ON AU TABLE IN OBJECT INFORMATION TABLE, etc. |
| | | ITEM #2 INFO. | APPROPRIATE AU NUMBER ON AU TABLE IN OBJECT INFORMATION TABLE, etc. |
| | | ITEM #3 INFO. | APPROPRIATE AU NUMBER ON AU TABLE IN OBJECT INFORMATION TABLE, etc. |
| | OTHER INFORMATION | | |
| P LIST #2 INFORMATION table | P LIST #2 COMPREHENSIVE INFORMATION | | THE TOTAL NUMBER OF CONSTITUENT ITEMS=1, OTHER INFORMATION |
| | P LIST #2 ITEM INFO. table | ITEM #1 INFO. | APPROPRIATE AU NUMBER ON AU TABLE IN OBJECT INFORMATION TABLE, etc. |
| | OTHER INFORMATION | | |
| P LIST #3 INFORMATION table | P LIST #3 COMPREHENSIVE INFORMATION | | THE TOTAL NUMBER OF CONSTITUENT ITEMS=2, OTHER INFORMATION |
| | P LIST #3 ITEM INFO. table | ITEM #1 INFO. | APPROPRIATE AU NUMBER ON AU TABLE IN OBJECT INFORMATION TABLE, etc. |
| | | ITEM #2 INFO. | APPROPRIATE AU NUMBER ON AU TABLE IN OBJECT INFORMATION TABLE, etc. |
| | OTHER INFORMATION | | |
| P LIST #4 INFORMATION table | P LIST #4 COMPREHENSIVE INFORMATION | | THE TOTAL NUMBER OF CONSTITUENT ITEMS=1, OTHER INFORMATION |
| | P LIST #4 ITEM INFO. table | ITEM #1 INFO. | APPROPRIATE AU NUMBER ON AU TABLE IN OBJECT INFORMATION TABLE, etc. |
| | OTHER INFORMATION | | |

FIG. 21

OBJECT INFORMATION 131

AU Table

| FIELD NAME | | | | CONTENTS |
|---|---|---|---|---|
| AU TABLE COMPREHENSIVE INFO. | | | | NUMBER OF AUs, POINTER TO EACH AU, etc. |
| AU Table | AU #1 (1321) | PU #1 | ES_Table Index #1 | INDEX NO. OF ES_map table = 1 |
| | | | ES_Table Index #2 | 3 |
| | | PU #2 | ES_Table Index #1 | 4 |
| | | | ES_Table Index #2 | 5 |
| | AU #2 | PU #1 | ES_Table Index #1 | 9 |
| | | | ES_Table Index #2 | 10 |
| | | PU #2 | ES_Table Index #1 | 12 |
| | | | ES_Table Index #2 | 13 |
| | AU #3 (3021) | PU #1 | ES_Table Index #1 | 14 |
| | | | ES_Table Index #2 | 15 |
| | | | ES_Table Index #3 | 16 |
| | | | ES_Table Index #4 | 17 |
| | | | ES_Table Index #5 | 18 |
| OTHER INFORMATION | | | | |

ES_Map Table 134

| FIELD NAME | | CONTENTS |
|---|---|---|
| ES_Map Table | ES_map table COMPREHENSIVE INFORMATION | INDEX NO., etc. |
| | Index #1 | ES_PID VALUE =101 |
| | | ADDRESS INFORMATION |
| | Index #2 | ES_PID =102 |
| | | ADDRESS INFORMATION |
| | Index #3 | ES_PID =103 |
| | | ADDRESS INFORMATION |
| | Index #4 | ES_PID =201 |
| | | ADDRESS INFORMATION |
| | Index #5 | ES_PID =202 |
| | | ADDRESS INFORMATION |
| | Index #6 | ES_PID =301 |
| | | ADDRESS INFORMATION |
| | Index #7 | ES_PID =302 |
| | | ADDRESS INFORMATION |
| | Index #8 | ES_PID =303 |
| | | ADDRESS INFORMATION |
| | Index #9 | ES_PID =201 |
| | | ADDRESS INFORMATION |
| | Index #10 | ES_PID =202 |
| | | ADDRESS INFORMATION |
| | Index #11 | ES_PID =203 |
| | | ADDRESS INFORMATION |
| | Index #12 | ES_PID =101 |
| | | ADDRESS INFORMATION |
| | Index #13 | ES_PID =102 |
| | | ADDRESS INFORMATION |
| | Index #14 | ES_PID =101 |
| | | ADDRESS INFORMATION |
| | Index #15 | ES_PID =102 |
| | | ADDRESS INFORMATION |
| | Index #16 | ES_PID =103 |
| | | ADDRESS INFORMATION |
| | Index #17 | ES_PID =104 |
| | | ADDRESS INFORMATION |
| | Index #18 | ES_PID =105 |
| | | ADDRESS INFORMATION |
| | OTHER INFORMATION | |

# INFORMATION RECORDING MEDIUM, INFORMATION RECORDING APPARATUS AND METHOD, INFORMATION REPRODUCING APPARATUS AND METHOD, INFORMATION RECORDING/REPRODUCING APPARATUS AND METHOD, RECORDING OR REPRODUCTION CONTROL COMPUTER PROGRAM, AND DATA STRUCTURE CONTAINING CONTROL SIGNAL

TECHNICAL FIELD

The present invention relates to an information recording medium, such as a high-density optical disc, on which various information can be recorded at high density, such as main picture information or video information, audio information, sub picture information, and reproduction control information, an apparatus for and a method of recording the information onto the information recording medium, an apparatus for and a method of reproducing the information from the information recording medium, an apparatus and a method capable of both recording and reproducing the information, a computer program for controlling the record or the reproduction, and a data structure including a control signal for controlling the reproduction.

DESCRIPTION OF THE RELATED ART

DVDs are generalized as optical discs on which various information is recorded, such as the video information, the audio information, the sub picture information, and the reproduction control information. According to the DVD standard, the video information (e.g. video data), the audio information (e.g. audio data), and the sub picture information (e.g. sub picture data) are individually packetized with the reproduction control information (e.g. navigation data) and are multiplexed and recorded on a disc in the "program stream" format of the MPEG 2 (Moving Picture Experts Group phase 2) standard, which is a highly efficient encoding technique. In the video information among them, there is only one stream of data compressed according to the MPEG video format (ISO 13818-2) within one program stream. On the other hand, the audio information is recorded in a plurality of methods (namely, linear PCM, AC-3, MPEG audio, and the like). The audio information can exist up to 8 streams within one program stream. The sub picture information is defined with a bit map and is compressed and recorded in a run-length method. The sub picture information can exist up to 32 streams within one program stream. In the case of the DVD, as described above, a plurality of streams of the chooseable or selectable audio information (e.g. streams of a stereo sound, a surrounding sound, an original English sound, a dubbed Japanese sound, and the like) and a plurality of streams of the chooseable or selectable sub picture information (e.g. streams of Japanese subtitle, English subtitle, and the like) are multiplexed and recorded by using the program stream format, for one stream of the video information in one movie or film, for example.

On the other hand, the "transport stream" format of the MPEG 2 standard has been recently standardized, and this is appropriate for data transmission. According to this transport stream format, a plurality of "elementary streams" are transmitted at the same time. For example, a plurality of shows or programs, such as many TV channels of satellite digital broadcasting, are time-division-multiplexed to one satellite wave and are transmitted at the same time. Namely, in the transport stream format, it is possible to time-division-multiplex the elementary streams of a plurality of main pictures or video, each of which has a large data amount, and transmit them at the same time. For example, it is possible to transmit at the same time a plurality of movies recorded on a plurality of DVDs.

DISCLOSURE OF INVENTION

However, in the above described DVD, although the video information of one stream can be multiplexed and recorded with the audio information, the sub picture information, and the like of a plurality of streams, the video of the plurality of streams cannot be multiplexed and recorded. Namely, the DVD, on which recording is performed on the basis of the program stream format of the MPEG 2, has such a problem that a plurality of shows or programs cannot be essentially multiplexed and recorded thereon, which are transmitted at that same time in the transport stream format of the MPEG 2 as described above.

Moreover, even if there is a disc which has such a high transmission rate and has such a high recording capacity or such a high recording density as to be capable of recording at the same time the plurality of shows or programs transmitted in the transport stream format, it is extremely important to try to save the recording capacity on the disc and reduce the processing load at the time of the reproduction. Especially, in the reproduction of the disc of this kind, as opposed to a tuner for performing simple tuning, there is such a strong request as to accurately perform interactive reproduction unique to an information reproducing apparatus or special reproduction processing, such as searching and scanning. It is technically difficult to try, while responding to the above request, to save the recording capacity on the disc and reduce the processing load at the time of the reproduction, which is a problem.

It is therefore an object of the present invention to provide an information recording medium, an apparatus for and a method of recording information, an apparatus for and a method of reproducing the information, an apparatus for and a method of recording and reproducing the information, a computer program for controlling the record or the reproduction, and a data structure including a control signal for controlling the reproduction, which make it possible to efficiently record one or a plurality of titles provided with complicated and a large amount of content information that enables the interactive or special reproduction, for example, and to efficiently reproduce a desired one of them relatively easily.

The above object of the present invention can be achieved by an information recording medium on which one or a plurality of titles, each of which is a logically-grouped information unit, are recorded, provided with: an object data file for storing object data which constitutes a series of content information; a play list information file for storing a plurality of play list information which defines a reproduction sequence of the object data stored in the object data file by a unit of play list which is logically accessible; and a disc information file for storing a plurality of information groups including, as reproduction control information for controlling the reproduction of the object data file, (i) play list specification information for specifying one play list information which defines the play list to be reproduced from among the plurality of play list information stored in the play list information file, (ii) Pre command information which indicates a command to be executed before the reproduction based on the one play list information, and (iii) Post command information which indicates a command to be executed after the reproduction based on the one play list information, the title being logically constructed by one or more than one of the plurality of information groups, the Pre command information including a Pre command table on which a command group comprising zero, one or more statements are written, the Post command information including a Post command table on which a command group comprising zero, one or more statements are written, the Pre command information and the Post command information including a command pointer which is written separately from the Pre command table and the Post command table and which specifies the address of each command included in the Pre command table and the Post command table.

According to the information recording medium, the object data file stores object data which constitutes a series of content information. Here, "the series of content information" is constructed, for example, of the video information (video data), the audio information (audio data), the sub picture information (sub picture data), and the like. This various content information is multiplexed in the format of a transport stream of the MPEG 2 described above, for example. Alternatively, it may not be multiplexed in the above manner.

The play list information file stores a plurality of play list information which defines a reproduction sequence of the object data stored in the object data file, by a unit of play list which is logically accessible by an information reproducing apparatus. The play list may be, for example, a group of Items which are logically accessible. The play list information may include Item information which specifies the group of Items.

The disc information file stores a plurality of information groups (e.g. "title play lists" as described later) including, as the reproduction control information for controlling the reproduction of the object data file: the play list specification information, the Pre command information, and the Post command information. Especially here, the play list specification information specifies one play list information which defines the play list to be reproduced from among the plurality of play list information stored in the play list information file, as described above. The Pre command information indicates a command to be executed before the reproduction based on the one play list information, while the Post command information indicates a command to be executed after the reproduction based on the one play list information. Here, the "Pre command" is a command which gives instructions for the automatic execution of audio stream selecting of the above-described transport stream or the like in the reproduction, and for the execution of various-parameter setting or the like required in the reproduction. On the other hand, the "Post command" is a command which gives instructions for the execution of various-parameter processing for a process of ending the reproduction, and for the execution of branch-condition judging or the like. Since even the play list information which defines the same play list can be combined with a different Pre command and a different Post command, due to this combination, it is possible to construct a different title. Moreover, since even the same play list information can be specified by a plurality of play list specification information, due to this specification, it is possible to construct a different title.

Incidentally, in the above-described DVD, the reproduction is performed using the reproduction control information (what is called "PGCI") which is constructed by unifying the play list of the present invention and the commands to be executed before and after the reproduction of the play list. Therefore, technically, it is extremely difficult or impossible to share the same play list, and further, it is also difficult or impossible to realize a different title by combining a different command to the same play list.

Especially, in the present invention, the Pre command information includes the Pre command table and the Post command information includes the Post command table, so that by referring to the Pre command table and the Post command table which are separately prepared for the Pre command information and the Post command information, for example, it is possible to relatively easily and quickly perform even relatively complicated and advanced reproduction control on the basis of the above-described information group (e.g. the title play list). Moreover, the Pre command information and the Post command information includes the command pointer which specifies the address of each command included in the Pre command table and the Post command table, so that when referring to the Pre command table and the Post command table by the Information reproducing apparatus, it is possible to firstly refer to the command pointer common to both the Pre command information and the Post command information, and then refer to the Pre command information included in the Pre command table or the Post command information included in the Post command table on which the address is specified by this command pointer. Therefore, it is possible to store the Pre command information or the Post command information in the disc information file efficiently and in an organized form.

As a result, according to the information recording medium, the efficient reproduction of a desired title can be performed by controlling the reproduction of the information reproducing apparatus depending on the information group (e.g. the title play list) including the play list specification information, the Pre command information, and the Post command information stored in the disc information file. Especially, by changing the combination of the same play list information with the Pre command or the Post command, or by sharing it by the plurality of play list specification information, it is possible to reduce, as a whole, the recording capacity required for the information recording medium to reproduce the title. Therefore, it is possible to efficiently record onto the information recording medium one or a plurality of titles provided with complicated and a large amount of content information that enables the interactive or special reproduction, for example, and to efficiently reproduce a desired one of them relatively easily.

In one aspect of the information recording medium of the present invention, the object data is constructed such that an entire stream including a plurality of portion streams, each of which is provided with the content information, is multiplexed by a unit of packet, which is a physically accessible unit and which stores therein a piece of the content information, the information recording medium further provided with an object information file for storing correspondence definition information which defines the correspondence relationship between a plurality of packets to be multiplexed and the plurality of portion streams as another reproduction control information for controlling the reproduction of the object data file.

According to this aspect, the entire stream, such as at least one portion of the transport stream of the MPEG 2, includes a plurality of portion streams, such as elementary streams. Namely, one "portion stream" herein indicates one data array or information array, such as the video stream, the audio stream, and the sub picture stream constituting a series of content, which can be, for example, the elementary stream. On the other hand, one "entire stream" herein indicates the data array or information array provided with a plurality of portion streams in a bundle. The entire stream of this type is multiplexed-and-recorded on the information recording medium by a unit of packet (e.g. TS packet as described later), which is a physically accessible unit by the information reproducing apparatus. The object data file is a logically accessible unit by the information reproducing apparatus and stores the object data provided with a plurality of packets, each of which stores therein a piece of the content information. Moreover, the object information file stores, as another reproduction control information for controlling the reproduction of the object data file by the information reproducing apparatus, the correspondence definition information (e.g. an ES_Map Table indicating an elementary stream packet ID (ES_PID), as described later).

Therefore, in the information reproducing apparatus, it becomes possible to reproduce a desired show or program constructed of the combination of or single content information provided with one portion of the entire stream which is multiplexed and recorded on the information recording medium, on the basis of the correspondence relationship between a plurality of packets and a plurality of portion streams multiplexed at a same time point, which is described in the correspondence definition information.

Incidentally, various information stored in the disc information file, the play list information file, and the object information file may not be multiplexed by a unit of packet on the information recording medium, preferably, from the viewpoint of a quickly and easily-executed reproduction control, as opposed to the case of the object data file.

In this aspect, the play list information file may be collectively recorded in one area on the information recording medium, the disc information file may be collectively recorded in another area on the information recording medium, and the object information file may be collectively recorded in another area on the information recording medium.

By constituting the information recording medium in this manner, in the reproduction, it is possible to efficiently reproduce the object data multiplexed-and-recorded by a unit of packet firstly by separately obtaining the play list information, the above-described information group (e.g. the title play list), the correspondence definition information, and the like, with each of them obtained collectively, and then on the basis of them. Moreover, it is possible to accurately perform special reproduction processing, such as searching, scanning, and interactive reproduction.

In another aspect of the information recording medium, the play list information file is collectively recorded in one area on the information recording medium, and the disc information file is collectively recorded in another area on the information recording medium.

According to this aspect, the information recording medium in this manner, in the reproduction, it is possible to efficiently reproduce the object data multiplexed-and-recorded by a unit of packet firstly by separately obtaining the play list information, the above-described information group (e.g. the title play list), and the like, with each of them obtained collectively, and then on the basis of them. Moreover, it is possible to accurately perform special reproduction processing, such as searching, scanning, and interactive reproduction.

The above object of the present invention can be achieved by an information recording apparatus for recording one or a plurality of titles, each of which is a logically-grouped information unit, onto an information recording medium, the apparatus provided with: a first recording device for recording an object data file for storing object data which constitutes a series of content information; a second recording device for recording a play list information file for storing a plurality of play list information which defines a reproduction sequence of the object data stored in the object data file by a unit of play list which is logically accessible; and a third recording device for recording a disc information file for storing a plurality of information groups including, as reproduction control information for controlling the reproduction of the object data file, (i) play list specification information for specifying one play list information which defines the play list to be reproduced from among the plurality of play list information stored in the play list information file, (ii) Pre command information which indicates a command to be executed before the reproduction based on the one play list information, and (iii) Post command information which indicates a command to be executed after the reproduction based on the one play list information, the title being logically constructed by one or more than one of the information groups, the Pre command information including a Pre command table on which a command group comprising zero, one or more statements are written, the Post command information including a Post command table on which a command group comprising zero, one or more statements are written, the Pre command information and the Post command information including a command pointer which is written separately from the Pre command table and the Post command table and which specifies the address of each command included in the Pre command table and the Post command table.

According to the information recording apparatus of the present invention, the object data file for storing the object data is recorded by the first recording device, such as a system controller, an encoder, a TS object generator as described later, and an optical pickup. The play list information file for storing the play list information is recorded by the second recording device, such as a system controller and an optical pickup. The disc information file for storing the information group (e.g. the title play list), which includes, as the reproduction control information, the play list specification information, the Pre command information, and the Post command information, is recorded by the third recording device, such as a system controller and an optical pickup. In this case, independently of the record of the play list information by the second recording device, the above-described information group (e.g. the title play list) is recorded by the third recording device. Therefore, by changing the combination of the same play list information with the Pre command or the Post command, or by sharing it by the plurality of play list specification information, it is possible to reduce, as a whole, the recording capacity required. Consequently, as for the above-described information recording medium of the present invention, it is possible to efficiently record onto the information recording medium one or a plurality of titles provided with complicated and a large amount of content information that enables the interactive or special reproduction, for example.

Especially, in the present invention, the Pre command information and the Post command information include the Pre command table and the Post command table, respectively, so that it is possible to relatively easily and quickly perform even relatively complicated and advanced reproduction control. Moreover, the Pre command information and the Post command information include the command pointer, so that it is possible to store the Pre command information or the Post command information in the disc information file efficiently and in an organized form.

Incidentally, the information recording apparatus of the present invention can also employ various aspects in response to various aspects of the above-described information recording medium of the present invention.

The above object of the present invention can be achieved by an information recording method of recording one or a plurality of titles, each of which is a logically-grouped information unit, onto an information recording medium, the method provided with: a first recording process of recording an object data file for storing object data which constitutes a series of content information; a second recording process of recording a play list information file for storing a plurality of play list information which defines a reproduction sequence of the object data stored in the object data file by a unit of play list which is logically accessible; and a third recording process of recording a disc information file for storing a plurality of information groups including, as reproduction control information for controlling the reproduction of the object data file, (i) play list specification information for specifying one play list information which defines the play list to be reproduced from among the plurality of play list information stored in the play list information file, (ii) Pre command information which indicates a command to be executed before the reproduction based on the one play list information, and (iii) Post command information which indicates a command to be executed after the reproduction based on the one play list information, the title being logically constructed by one or more than one of the information groups, the Pre command information including a Pre command table on which a command group comprising zero, one or more statements are written, the Post command information including a Post command table on which a command group comprising zero, one or more statements are written, the Pre command information and the Post command information including a command pointer which is written separately from the Pre command table and the Post command table and which specifies the address of each command included in the Pre command table and the Post command table.

According to the information recording method of the present invention, as is the case of the above-described information recording apparatus, the object data file for storing the object data is recorded by the first recording process. The play list information file for storing the play list information is recorded by the second recording process. The disc information file for storing the information group, which includes, as the reproduction control information, the play list specification information, the Pre command information, and the Post command information, is recorded by the third recording process. In this case, independently of the record of the play list information by the second recording process, the above-described information group is recorded by the third recording process. Therefore, it is possible to reduce, as a whole, the recording capacity required, and as for the above-described information recording medium of the present invention, it is possible to efficiently record thereon one or a plurality of titles provided with complicated and a large amount of content information.

Especially, in the present invention, the Pre command information and the Post command information include the Pre command table and the Post command table, respectively, so that it is possible to relatively easily and quickly perform even relatively complicated and advanced reproduction control. Moreover, the Pre command information and the Post command information include the command pointer, so that it is possible to store the Pre command information or the Post command information in the disc information file efficiently and in an organized form.

Incidentally, the information recording method of the present invention can also employ various aspects in response to various aspects of the above-described information recording medium of the present invention.

The above object of the present invention can be achieved by an information reproducing apparatus for reproducing at least one portion of the recorded titles from the above-described information recording medium of the present invention (including its various aspects), provided with: a reading device for physically reading information from the information recording medium; and a reproducing device for reproducing the object data included in the information read by the reading device, on the basis of the reproduction control information and the play list information included in the information read by the reading device.

According to the information reproducing apparatus, information is physically read by the reading device, such as an optical pickup and a demodulator, from the information recording medium by a unit of packet or the like. Then, the object data is reproduced by the reproducing device, such as a system controller, a demultiplexer, and a decoder, on the basis of the reproduction control information and the play list information included in this read information. Therefore, it is possible to appropriately reproduce the titles recorded on the above-described information recording medium of the present invention.

Incidentally, the information reproducing apparatus of the present invention can also employ various aspects in response to various aspects of the above-described information recording medium of the present invention.

The above object of the present invention can be achieved by an information reproducing method of reproducing at least one portion of the recorded titles from the above-described information recording medium of the present invention (including its various aspects), provided with: a reading process of physically reading information from the information recording medium; and a reproducing process of reproducing the object data included in the information read by the reading device, on the basis of the reproduction control information and the play list information included in the information read by the reading device.

According to the information reproducing method, as is the case of the above-described information reproducing apparatus, information is physically read by the reading process from the information recording medium by a unit of packet or the like. Then, the object data is reproduced by the reproducing process on the basis of the reproduction control information and the play list information included in this read information. Therefore, it is possible to appropriately reproduce the titles recorded on the above-described information recording medium of the present invention.

Incidentally, the information reproducing method of the present invention can also employ various aspects in response to various aspects of the above-described information recording medium of the present invention.

The above object of the present invention can be achieved by an information recording and reproducing apparatus for recording one or a plurality of titles onto the above-described information recording medium of the present invention (including its various aspects), and for reproducing at least one portion of the recorded titles, provided with: a first recording device for recording the object data file; a second recording device for recording the play list information file; a third recording device for recording the disc information file; a reading device for physically reading information from the information recording medium; and a reproducing device for reproducing the object data included in the information read by the reading device, on the basis of the reproduction control information and the play list information included in the information read by the reading device.

According to the information recording and reproducing apparatus of the present invention, as with the above-described information recording apparatus of the present invention, the object data file is recorded by the first recording device, the play list information file is recorded by the second recording device, and the disc information file is recorded by the third recording device. Then, as with the above-described information reproducing apparatus of the present invention, information is physically read by the reading device from the information recording medium, and the object data is reproduced by the reproducing device on the basis of the reproduction control information and the play list information included in this read information. Therefore, as for the above-described information recording medium of the present invention, it is possible to efficiently record thereon one or a plurality of titles provided with complicated and a large amount of content information. Moreover, it is possible to appropriately reproduce this recorded title or titles.

Incidentally, the information recording and reproducing apparatus of the present invention can also employ various aspects in response to various aspects of the above-described information recording medium of the present invention.

The above object of the present invention can be achieved by an information recording and reproducing method of recording one or a plurality of titles onto the above-described information recording medium of the present invention (including its various aspects), and of reproducing at least one portion of the recorded titles, provided with: a first recording process of recording the object data file; a second recording process of recording the play list information file; a third recording process of recording the disc information file; a reading process of physically reading information from the information recording medium; and a reproducing process of reproducing the object data included in the information read by the reading device, on the basis of the reproduction control information and the play list information included in the information read by the reading device.

According to the information recording and reproducing method of the present invention, as with the above-described information recording method of the present invention, the object data file is recorded by the first recording process, the play list information file is recorded by the second recording process, and the disc information file is recorded by the third recording process. Then, as with the above-described information reproducing method of the present invention, information is physically read by the reading process from the information recording medium, and the object data is reproduced by the reproducing process on the basis of the reproduction control information and the play list information included in this read information. Therefore, as for the above-described information recording medium of the present invention, it is possible to efficiently record thereon one or a plurality of titles provided with complicated and a large amount of content information. Moreover, it is possible to appropriately reproduce this recorded title or titles.

Incidentally, the information recording and reproducing method of the present invention can also employ various aspects in response to various aspects of the above-described information recording medium of the present invention.

The above object of the present invention can be achieved by a computer program for controlling record which controls a computer provided in the above-described information recording apparatus of the present invention (including its various aspects) and which causes the computer to function as at least one portion of the first recording device, the second recording device, and the third recording device.

According to the computer program for controlling record of the present invention, the above described information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

The above object of the present invention can be achieved by a computer program for controlling reproduction which controls a computer provided in the above-described information reproducing apparatus of the present invention (including its various aspects) and which causes the computer to function as at least one portion of the reading device and the reproducing device.

According to the computer program for controlling reproduction of the present invention, the above described information reproducing apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

According to the computer program for controlling record and reproduction of the present invention, the above described information recording and reproducing apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

The above object of the present invention can be achieved by a data structure including a control signal, which includes one or a plurality of titles, each of which is a logically-grouped information unit, provided with: an object data file for storing object data which constitutes a series of content information; a play list information file for storing a plurality of play list information which defines a reproduction sequence of the object data stored in the object data file by a unit of play list which is logically accessible; and a disc information file for storing a plurality of information groups including, as reproduction control information for controlling the reproduction of the object data file, (i) play list specification information for specifying one play list information which defines the play list to be reproduced from among the plurality of play list information stored in the play list information file, (ii) Pre command information which indicates a command to be executed before the reproduction based on the one play list information, and (iii) Post command information which indicates a command to be executed after the reproduction based on the one play list information, the title being logically constructed by one or more than one of the plurality of information groups, the Pre command information including a Pre command table on which a command group comprising zero, one or more statements are written, the Post command information including a Post command table on which a command group comprising zero, one or more statements are written, the Pre command information and the Post command information including a command pointer which is written separately from the Pre command table and the Post command table and which specifies the address of each command included in the Pre command table and the Post command table.

According to the data structure including a control signal of the present invention, as is the case of the above-described information recording medium, it is possible to efficiently record onto the information recording medium one or a plurality of titles provided with complicated and a large amount of content information that enables the interactive or special reproduction, for example, and to efficiently reproduce a desired one of them relatively easily.

Incidentally, the data structure including a control signal of the present invention can also employ various aspects in response to various aspects of the above-described information recording medium of the present invention.

The above object of the present invention can be also achieved by a first program storage device readable by a computer in an information recording apparatus for tangibly embodying a program of instructions executable by the computer to perform method processes of recording information.

The above object of the present invention can be also achieved by a second program storage device readable by a computer in an information reproducing apparatus for tangibly embodying a program of instructions executable by the computer to perform method processes of reproducing information.

The above object of the present invention can be also achieved by a third program storage device readable by a computer in an information recording and reproducing apparatus for tangibly embodying a program of instructions executable by the computer to perform method processes of recording and reproducing information.

According to the first, second, or third program storage device, such as a CD-ROM, a ROM, a DVD-ROM, and a hard disk, of the present invention, the above described information recording, reproducing, or recording and reproducing method of the present invention can be relatively easily realized as a computer reads and executes the program of instructions or as it executes the program after downloading the program through a communication device.

The above object of the present invention can be also achieved by a first computer data signal embodied in a carrier wave and representing a series of instructions which cause a computer in an information recording apparatus to perform method processes of recording information.

The above object of the present invention can be also achieved by a second computer data signal embodied in a carrier wave and representing a series of instructions which cause a computer in an information reproducing apparatus to perform method processes of reproducing information.

The above object of the present invention can be also achieved by a third computer data signal embodied in a carrier wave and representing a series of instructions which cause a computer in an information recording and reproducing apparatus to perform method processes of recording and reproducing information.

According to the first, second, or third computer data signal embodied in the carrier wave of the present invention, as the computer downloads the program in the computer data signal through a computer network or the like, and executes this program, it is possible to relatively easily realize the above described information recording, reproducing, or recording and reproducing method of the present invention.

These functions and other advantages of the invention will be apparent from the following description of embodiments.

BRIEF DESCRIPTION OF DRAWINGS

FIG. 17 is a schematic diagram showing one specific example of the data structure of a disc information file of the embodiment;

FIG. 18 is a schematic diagram showing another specific example of the data structure of the disc information file of the embodiment;

FIG. 19 is a schematic diagram showing one specific example of the data structure of a command table of the embodiment;

FIG. 20 is a schematic diagram showing one specific example of the data structure of a play list information table constructed in a play list information file in one specific example of the embodiment; and FIG. 21 is a schematic diagram showing one specific example of the data structures of an AU table constructed in an object information file and an ES map table related to the AU table in one specific example of the embodiment.

BEST MODE FOR CARRYING OUT THE INVENTION (Information Recording Medium)

The embodiment of an information recording medium of the present invention will be explained with reference to FIG. 1 to FIG. 8. In this embodiment, the information recording medium of the present invention is applied to an optical disc of a type capable of recording (writing) and reproducing (reading).

Firstly, the basic structure of the optical disc in the embodiment will be explained with reference to FIG. 1. The upper part of FIG. 1 is a schematic plan view of the optical disc structure having a plurality of areas, and the bottom part is a schematic diagram of the area structure in its radial direction.

Figure 1:
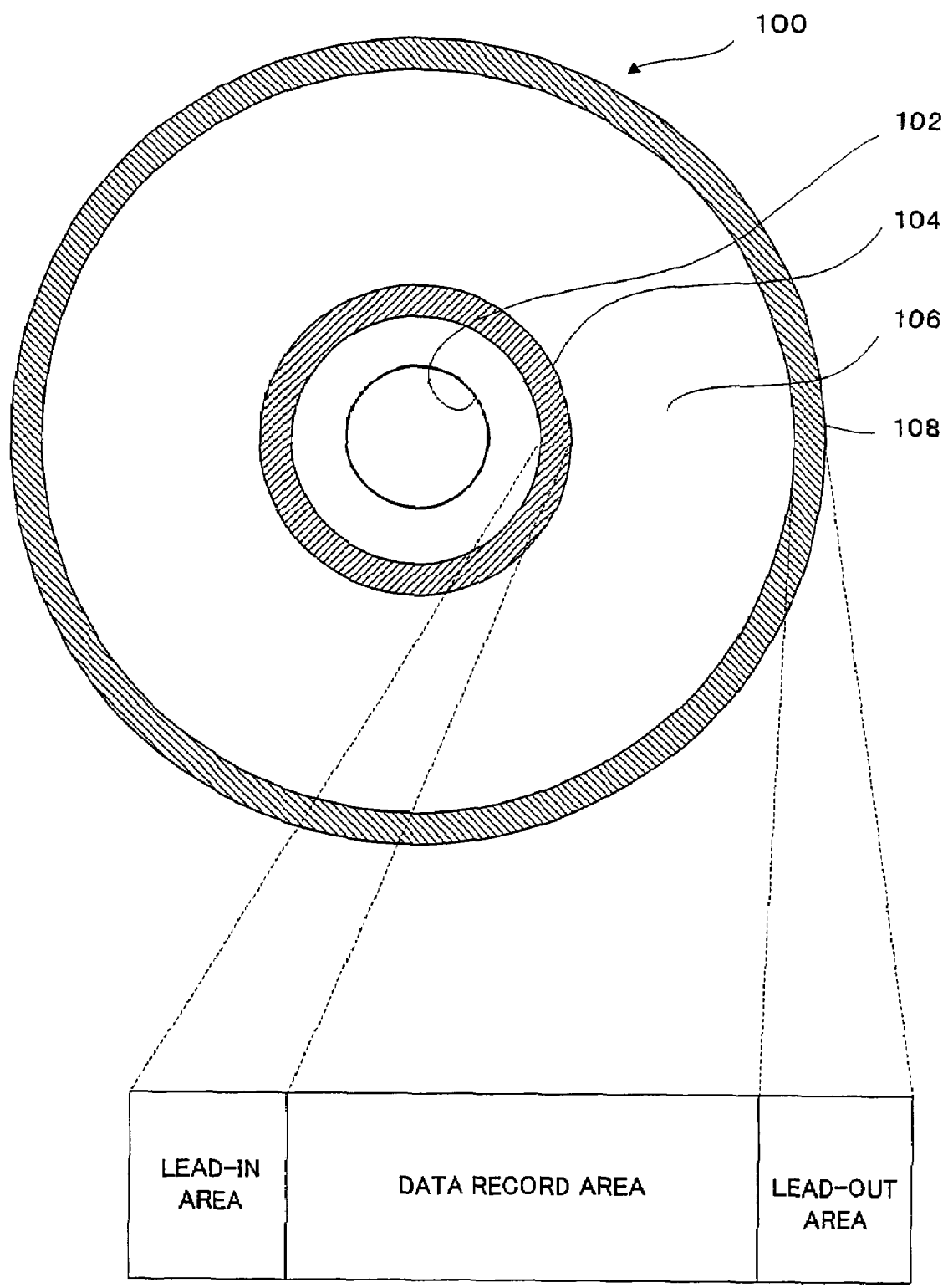
FIG. 1 is a diagram showing a basic structure of an optical disc as being one embodiment of an information recording medium of the present invention, the upper part being a schematic plan view of the optical disc having a plurality of areas, the corresponding bottom part being an schematic diagram of the area structure in the radial direction.

As shown in FIG. 1, an optical disc 100 is recordable in various recording methods, such as a magnet-optical method and a phase transition method, onto which it is possible to record (write) information a plurality of times or only once. It is provided with a lead-in area 104, a data record area 106, and a lead-out area 108 on a recording surface on the disc main body, which is about 12 cm in diameter, as is the DVD, with a center hole 102 as the center, in the direction from the inner circumference to the outer circumference. In each area, groove tracks and land tracks are alternately placed spirally or coaxially with the center hole 102 as the center, for example. These groove tracks may be wobbled, and pre-pits may be formed on either or both of the tracks. Incidentally, the present invention is not specially limited to an optical disc having these three areas.

Figure 2A:
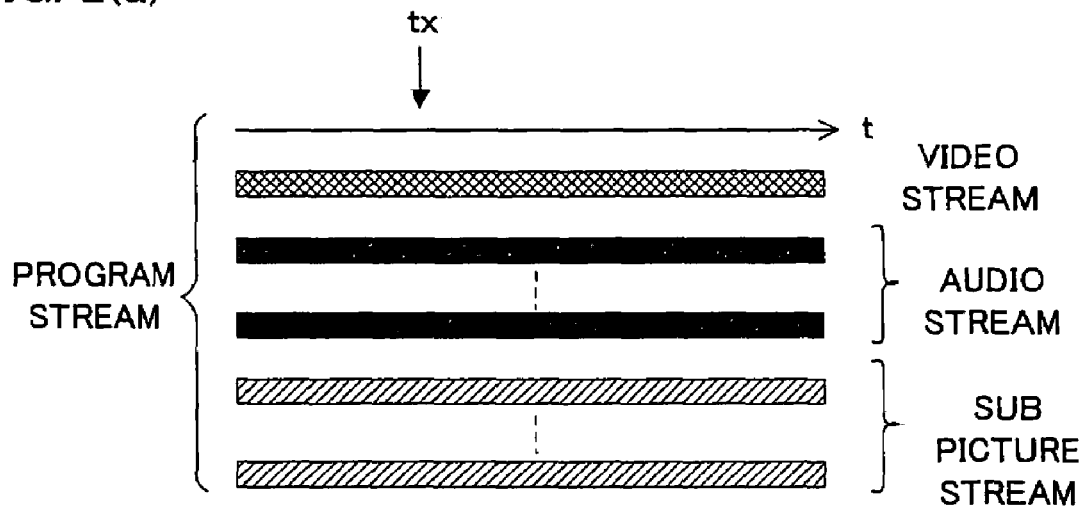
FIG. 2 are a schematic diagram of the conventional program stream of the MPEG 2 (FIG. 2(a)) and a schematic diagram of the transport stream of the MPEG 2 used in the embodiment (FIG. 2(b))
Figure 2B:
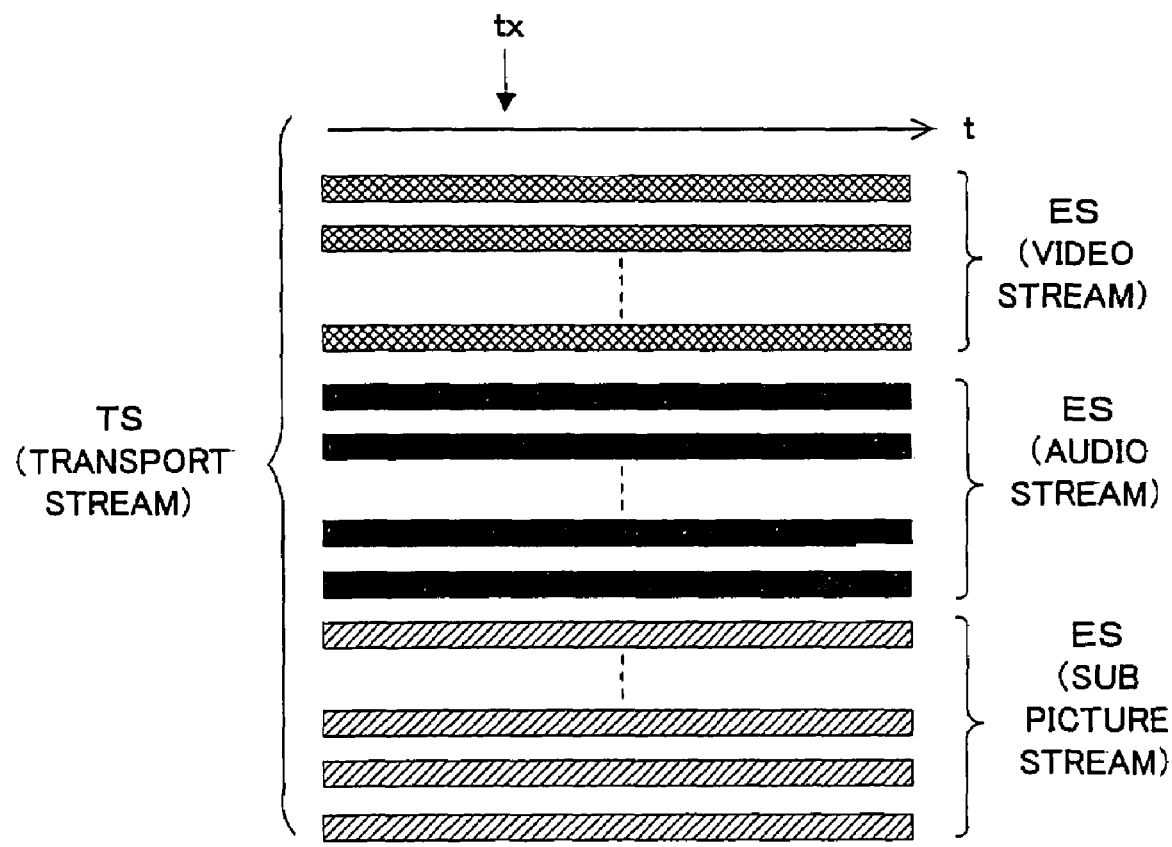

Secondly, the structure of a transport stream (TS) recorded on the optical disc of the present invention will be explained with reference to FIG. 2. FIG. 2(a) shows the structure of a conventional program stream of the MPEG 2, as a comparison. FIG. 2(b) shows the structure of the transport stream (TS) of the MPEG 2.

In FIG. 2(a), one program stream includes (i) only one video stream for video data as being the video information, and further (ii) at most 8 audio streams for audio data as being the audio information, and also (iii) at most 32 sub picture streams for sub picture data as being the sub picture information, along a time axis t. Namely, the video data multiplexed at an arbitrary time point tx is related to only the one video stream. For example, a plurality of video streams corresponding to a plurality of TV shows or movies cannot be included in the program stream at the same time. In order to multiplex the TV show and the like accompanying pictures and transmit or record them, at least one video stream is required for each TV show and the like, so that the program stream format in which only one video stream exists cannot allow the plurality of TV shows and the like to be transmitted or recorded after multiplexing them.

In FIG. 2(b), one transport stream (TS) includes (i) a plurality of video streams, as an elementary stream (ES) for the video data as being the video information, and further (ii) a plurality of audio streams, as an elementary stream (ES) for the audio data as being the audio information, and also (iii) a plurality of sub picture streams, as an elementary stream (ES) for the sub picture data as being the sub picture information. Namely, the video data multiplexed at an arbitrary time point tx is related to the plurality of video streams. For example, the plurality of video streams corresponding to a plurality of TV shows or movies can be included in the transport stream at the same time. As described above, the transport stream format whose transmission rate is high and in which there are the plurality of video streams can allow the plurality of TV shows and the like to be transmitted or recorded after multiplexing them. However, digital broadcasting that employs an existing transport stream does not transmit the sub picture stream.

Incidentally, in FIG. 2(a) and FIG. 2(b), the video stream, the audio stream, and the sub picture stream are arranged in this order from up to down for explanatory convenience; however, this order is not intended to correspond to an order of multiplexing them in units of packet, as described later, or the like. In the transport stream, one combination, which is one video stream, two audio streams, and two sub picture streams, conceptually corresponds to one show, for example.

The optical disc 100 in the embodiment described above is constructed to record onto it the transport stream (TS) including a plurality of elementary streams (ES) in the above manner, i.e. to simultaneously record onto it the plurality of shows or programs, within the limit of the record rate.

Figure 3:
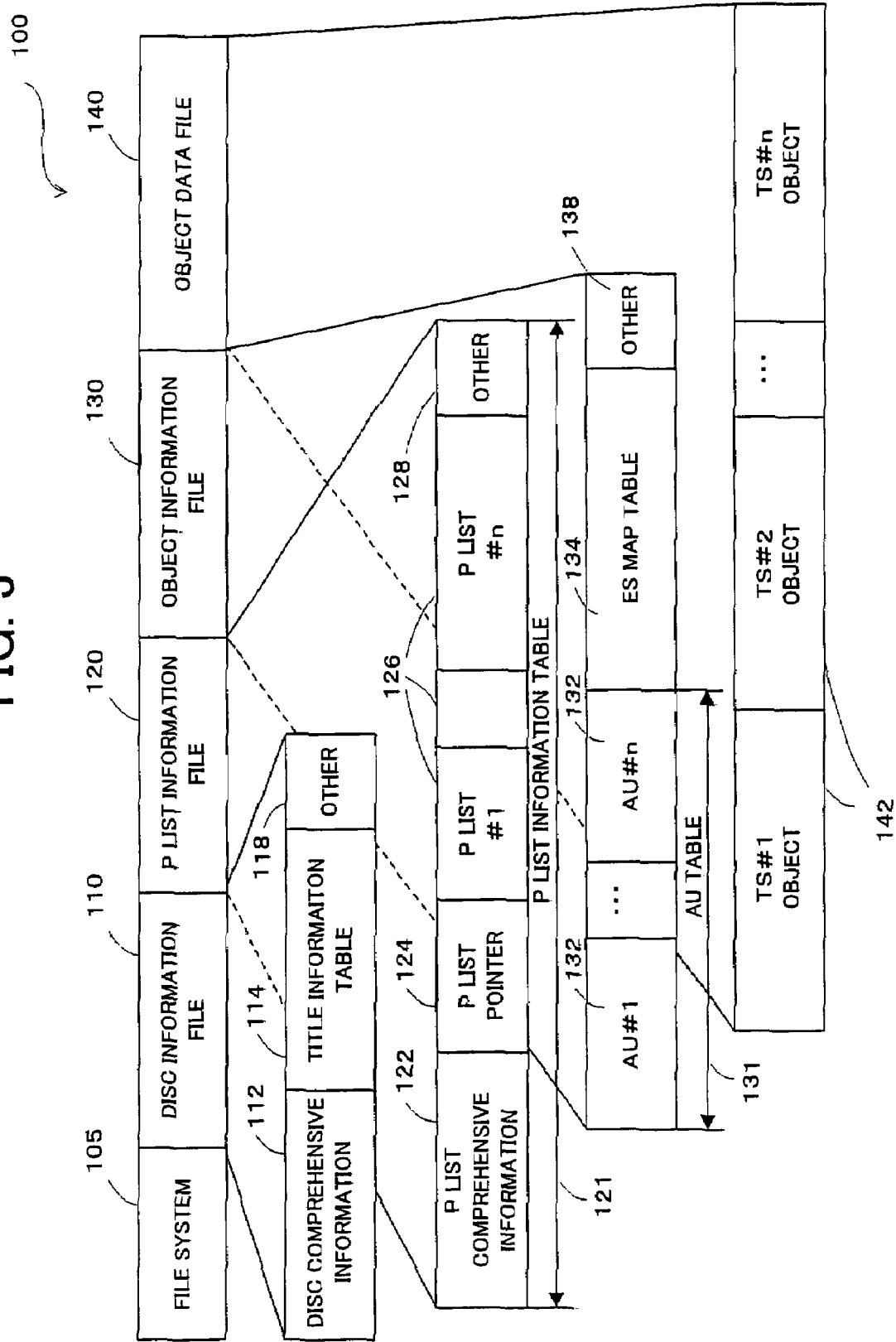
FIG. 3 is a schematic diagram showing a data structure recorded on the optical disc in the embodiment.
Figure 4:
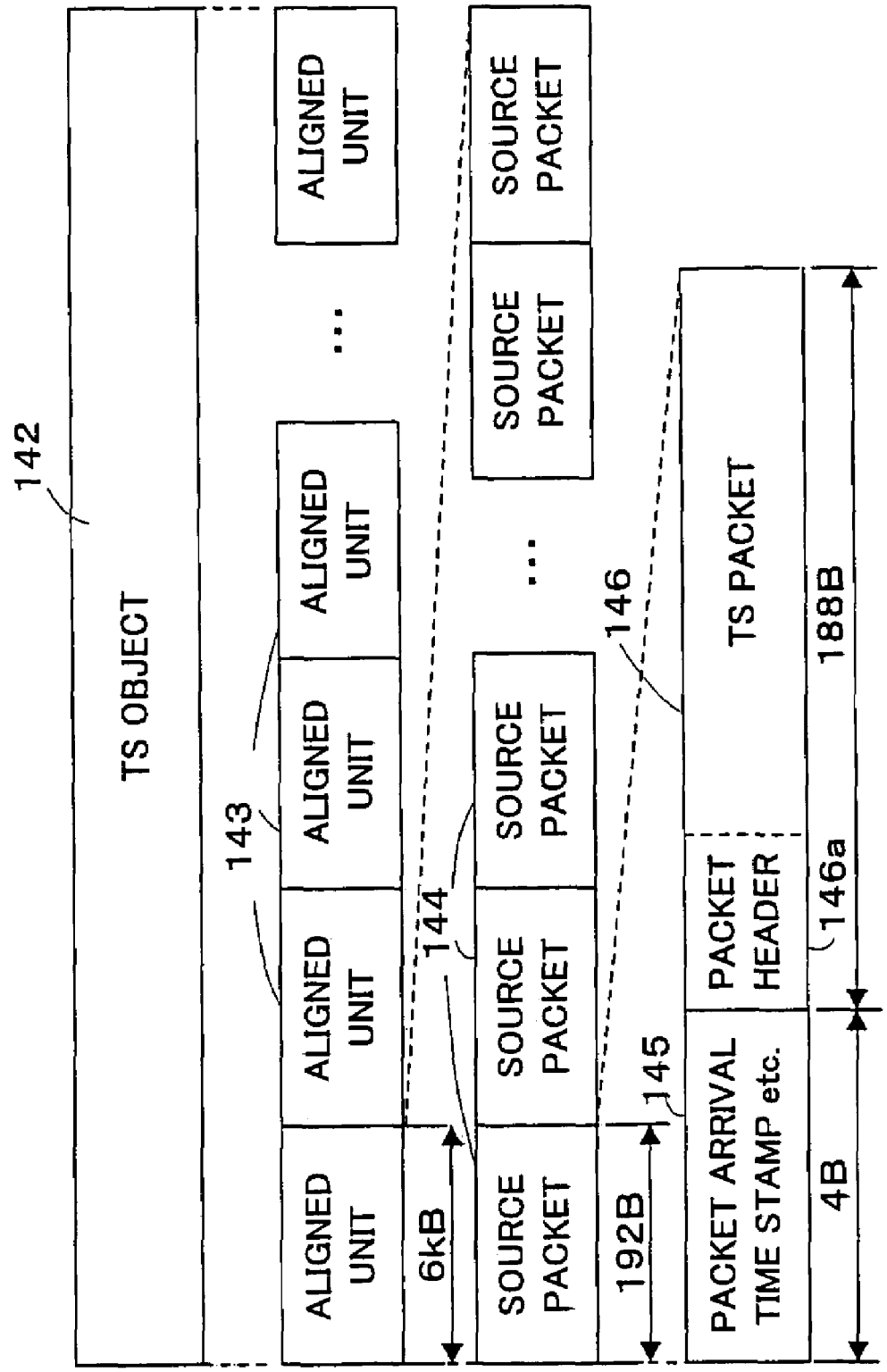
FIG. 4 is a schematic diagram showing details of the data structure in each object shown in FIG. 3.

Next, a data structure recorded on the optical disc 100 will be explained with reference to FIG. 3 and FIG. 4. FIG. 3 is a schematic diagram showing the data structure recorded on the optical disc 100. FIG. 4 is a schematic diagram showing details of the data structure in each object shown in FIG. 3.

In the explanation below, a "title" is a reproduction unit sequentially executing a plurality of "play lists", and is a logically large grouped unit, such as one movie and one TV show. The "play list" is a file for storing information necessary for the reproduction of an "object", and is provided with a plurality of "Items", each of which stores information about the reproduction range of the object to access the object. More specifically, "IN point information" indicating a start address of the object and "OUT point information" indicating an end address of the object are written in each Item. Incidentally, these "IN point information" and "OUT point information" may show the addresses directly, or show the addresses indirectly by showing a time length or a time point on a reproduction time axis. The "object" is the entity information of a content constituting the transport stream of the MPEG 2 described above.

In FIG. 3, the optical disc 100 is provided with the following four files as a logical structure: a disc information file 110, a play (P) list information file 120, an object information file 130, and an object data file 140. It is further provided with a file system 105 to manage those files. Incidentally, FIG. 3 does not directly show the physical data alignment on the optical disc 100, but it is possible to record with the arrangement order shown in FIG. 3 corresponding to the arrangement order shown in FIG. 1. Namely, it is possible to record the file system 105 or the like in the lead-in area 104, and then in the data record area 106, and further it is also possible to record the object data file 140 or the like in the data record area 106. Even if the lead-in area 104 and/or the lead-out area 108 shown in FIG. 1 do no exist, the file structure shown in FIG. 3 can be constructed.

The disc information file 110 is a file for storing comprehensive information about the whole optical disc 100, and it stores disc comprehensive information 112, a title information table 114, and other information 118. The disc comprehensive information 112 stores the total number of titles and the like in the optical disc 100, for example.

Especially in this embodiment, as described later, the title information table 114 stores a plurality of title play lists (refer to FIG. 8(a)), which is one example of an information group including play list specification information, a Pre command, and a Post command, in the format of a table for each title (refer to FIG. 17 and FIG. 18).

The play list information file 120 is a reproduction sequence information file. The play list information file 120 stores a play (P) list information table 121, which indicates the logical construction of each play list and which is separated into play (P) list comprehensive information 122, a play (P) list pointer 124, a plurality of play (P) lists 126 (P lists #1 to #n), and other information 128. This play list information table 121 stores the logical information of each play list 126 in the order of the play list number. In other words, the storing order of each play list 126 is the play list number. Moreover, it is also possible to refer to the same play list 126 from a plurality of titles at the above described title information table 114. Namely, even in the case where a title #n and a title #m use the same play list #p, it is possible to construct such that the play list #p in the play list information table 121 is pointed at the title information table 114.

The object information file 130 stores various attribute information about the storing position in the object data file 140 for each Item constituted in each play list 126 (i.e. a logical address that is a reproduction object) and about the reproduction of the Item. Especially, in this embodiment, the object information file 130 stores an AU (Associate Unit) table 131 including a plurality of AU information 132I (AU #1 to AU #n), as described later in detail, an ES (Elementary Stream) map table 134, and other information 138.

The object data file 140 stores a plurality of TS objects 142 (TS #1 object to TS #n object) for each transport streams (TS). Namely, it stores a plurality of entity data of the contents to be actually reproduced.

Incidentally, the four files explained with reference to FIG. 3 may be stored with each of them being separated into a plurality of files, and all of them may be managed or administered by the file system 105. For example, the object data file 140 can be separated into a plurality of data files, such as an object data file #1, an object data file #2, . . . and the like.

As shown in FIG. 4, the TS object 142 shown in FIG. 3, which is a logically reproducible unit, is divided into a plurality of aligned units 143, each of which has 6 kB data amount, for example. The head of the aligned units 143 corresponds to (or is "aligned" with) the head of the TS object 142. Each aligned unit 143 is further segmentized into a plurality of source packets 144, each of which has 192 B data amount. The source packet 144 is a physically reproducible unit, and by using this unit, i.e. by a unit of packet, at least the video data, the audio data, and the sub picture data are multiplexed among the data on the optical disc 100. The other information may be also multiplexed in this manner. Each source packet 144 includes: control information 145, which has 4 B data amount, for controlling the reproduction, such as a packet arrival time stamp indicating a reproduction start time point (i.e. a time point of starting demultiplexing) of the TS (transport stream) packet on a reproduction time axis etc.; and a TS packet 146, which has 188 B data amount. The TS packet 146 has a packet header 146a at the head portion thereof. The video data is packetized to be a "video packet", the audio data is packetized to be an "audio packet", the sub picture data is packetized to be a "sub picture packet", or the other data is packetized.

Figure 5:
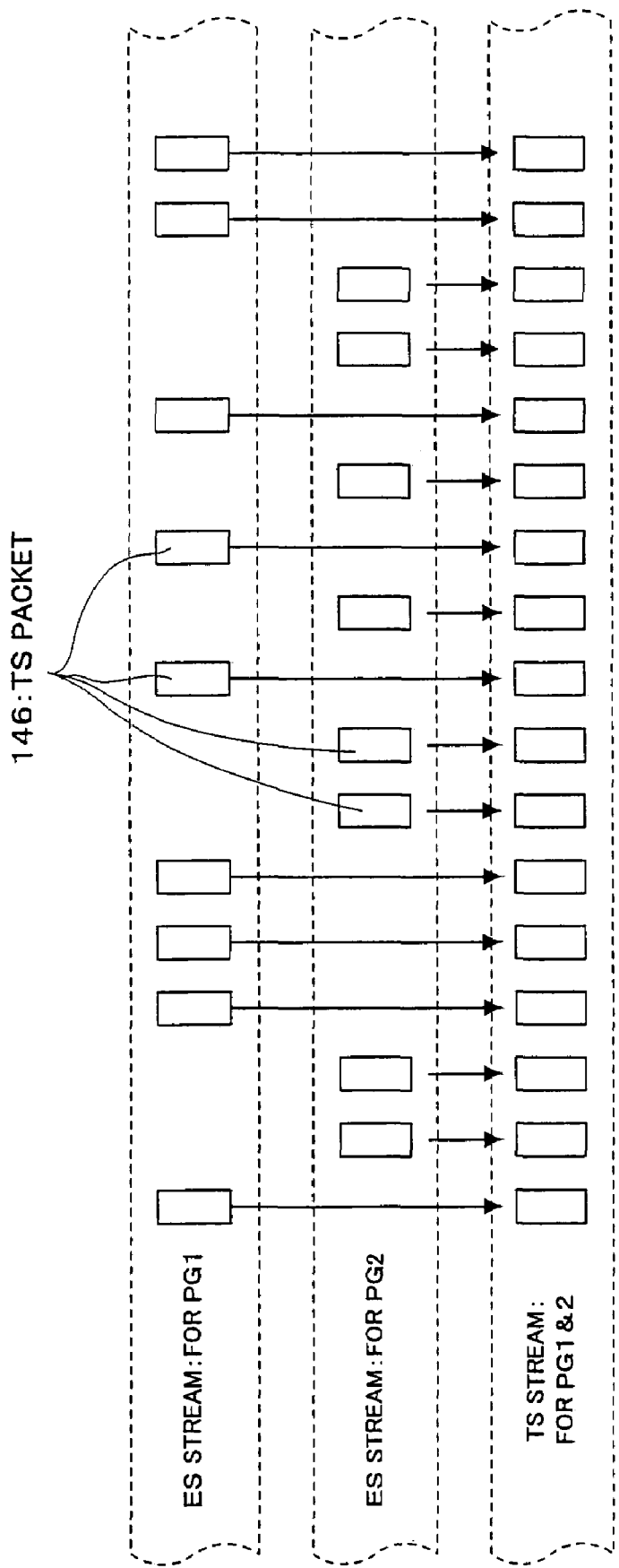
FIG. 5 is a schematic diagram conceptually showing that an elementary stream for a program #1 at an upper level and an elementary stream for a program #2 at a middle level are multiplexed, constituting a transport stream for these two programs at a low level, with the horizontal axis as a time axis.
Figure 6:
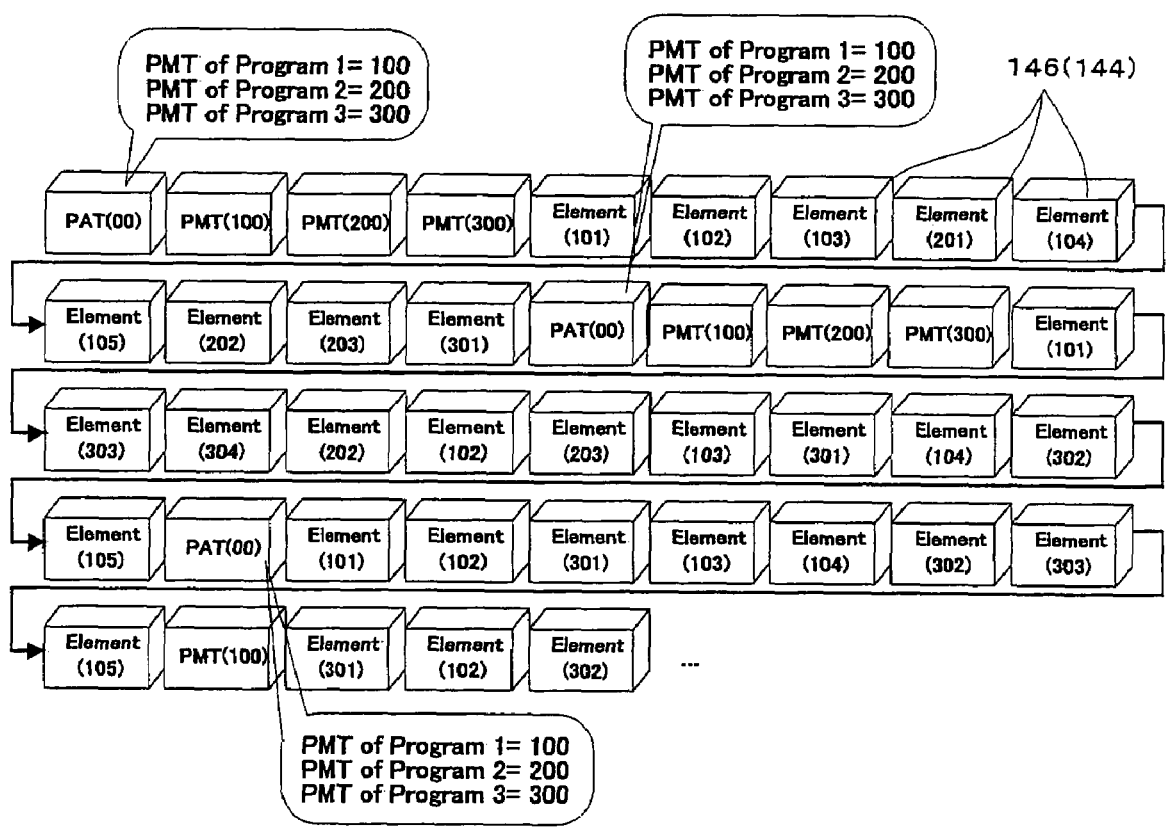
FIG. 6 is a schematic diagram conceptually showing the image of TS packets multiplexed in one transport stream as a packet alignment along time.

Next, with reference to FIG. 5 and FIG. 6, it will be explained the multiple record of the video data, the audio data, the sub picture data, and the like, which are in the transport stream format as shown in FIG. 2(b), on the optical disc 100 by the TS packet 146 shown in FIG. 4. FIG. 5 is a schematic diagram conceptually showing that an elementary stream (ES) for a program #1 (PG 1) at the upper level in the figure and an elementary stream (ES) for a program #2 (PG 2) at the middle level in the figure are multiplexed, constituting a transport stream (TS) for these two programs (PG 1 & PG 2) at the lower level in the figure, with the horizontal axis as a time axis. FIG. 6 is a schematic diagram conceptually showing the image of TS packets multiplexed in one transport stream (TS) as a packet alignment along time.

As shown in FIG. 5, the TS packets 146 with the video data for the program #1 packetized are discretely arranged with respect to the time axis in the elementary stream for the program #1 (the upper one), for example. The TS packets 146 with the video data for the program #2 packetized are discretely arranged with respect to the time axis in the elementary stream for the program #2 (the middle one), for example. Then, these TS packets 146 are multiplexed, constructing the transport stream (the lower one) for those two programs. Incidentally, this is omitted in FIG. 5 for explanatory convenience, but in fact, the elementary stream provided with the TS packets in which the audio data is packetized and the sub picture stream provided with the TS packets in which the sub picture data is packetized may be multiplexed as the elementary stream for the program #1 in the same manner as shown in FIG. 2(b). Moreover, in addition to these, the elementary stream provided with the TS packets in which the audio data is packetized and the sub picture stream provided with the TS packets in which the sub picture data is packetized may be multiplexed as the elementary stream for the program #2 in the same manner.

As shown in FIG. 6, in this embodiment, one TS stream is constructed of many TS packets 146 multiplexed as described above. Then, the many TS packets 146 in this multiplexed form obtain the information 145 such as the packet arrival time stamp and are multiplexed-and-recorded on the optical disc 100. Incidentally, "Element (i0j)" is used in FIG. 6 for the TS packet 146 comprising data which constitutes the program #i (i=1, 2, 3), with j (j=1, 2, . . . ) as a number indicating the order for each stream which constitutes the program. This (i0j) is a packet ID, which is the identification number of the TS packet 146 for each elementary stream. A specific value is given to this packet ID between the plurality of TS packets 146 multiplexed at a same time point so that the plurality of TS packets 146 can be mutually distinguished even if they are multiplexed at the same time point.

In FIG. 6, a PAT (Program Associate Table) and a PMT (Program Map Table) are also packetized in units of the TS packet 146 and are multiplexed. Among them, the PAT stores a table indicating a plurality of PMT packet IDs. Especially, with regard to the PAT, the MPEG 2 standard defines the addition of (000), as shown in FIG. 6, as a predetermined packet ID. Namely, it is constructed such that the TS packet 146 in which the PAT is packetized is detected as the TS packet 146 with its packet ID (000) from among many packets multiplexed at the same time point. The PMT stores a table indicating the packet ID for each elementary stream constituting each program with respect to one or a plurality of programs. To the PMT, an arbitrary packet ID may be added, but the packet ID of the PMT is indicated by the PAT detectable having the packet ID as (000), as described above. Therefore, the TS packets 146 in each of which the PMT is packetized (i.e. the TS packets 146 with the packet IDs (100), (200), and (300) added in FIG. 6) are detected by virtue of the PAT from among many packets multiplexed at the same time point.

In the case where the transport stream is digital-transmitted as shown in FIG. 6, the tuner can pick up the packets corresponding to the desired elementary stream from among the multiplexed packets by referring to the PAT and the PMT as constructed above, and demodulate them.

In this embodiment, the TS packet 146 stored in the TS object 142 shown in FIG. 4 includes these PAT and PMT packets. Namely, when the transport stream shown in FIG. 6 is transmitted, it can be recorded onto the optical disc 100 as it is, which is a great advantage.

Moreover, in this embodiment, the PAT and PMT as recorded above are not referred to when reproducing the optical disc 100. Instead, referring to the AU table 131 and the ES map table 134, as shown in FIG. 3 and as described later in detail, allows more effective reproduction, and also enables complicate multi-vision reproduction and the like to be treated with. On that account, in this embodiment, the corresponding relationship between the elementary stream and the packet, which are obtained by referring to the PAT and the PMT when demodulating and recording, is stored in the object information file 130 in the form of the AU table 131 and the ES map table 134 without packetizing nor multiplexing.

Figure 7:
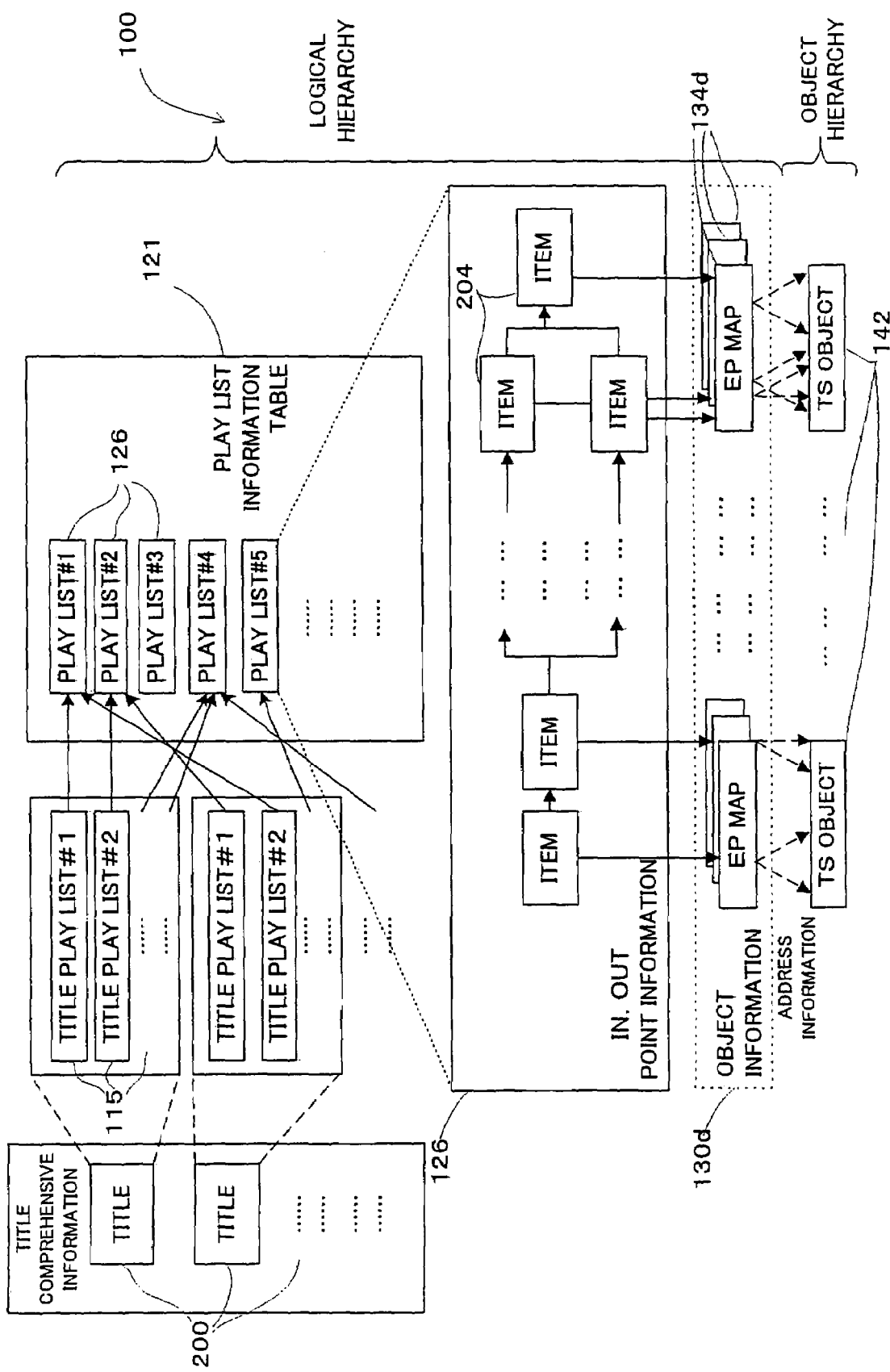
FIG. 7 is a schematic diagram showing the logical construction of data on the optical disc in the embodiment, focusing on the development of a logical hierarchy to an object hierarchy or an entity hierarchy.

Next, the logical construction of the data on the optical disc 100 will be explained with reference to FIG. 7 and FIG. 8. FIG. 7 is a schematic diagram showing the logical construction of the data on the optical disc 100, focusing on the development of a logical hierarchy to an object hierarchy or an entity hierarchy. FIG. 8 are schematic diagrams conceptually showing the details of a basic logical construction in the title play list constituting one title shown in FIG. 7 (FIG. 8(a)) and further three specific examples of the logical construction in the title play list (FIG. 8(b) to FIG. 8(d)).

In FIG. 7, on the optical disc 100, one or a plurality of titles 200 are recorded, each of which is a logically large unit, such as one movie or one TV show. Each title 200 is constructed of one or a plurality of title play lists 115 (title play lists #1, #2, . . . ).

Each title play list 115 is logically constructed of one or a plurality of play lists 126 (play lists #1, #2, . . . ). Here, the plurality of title play lists 115 constituting the same title 200 or a different title 200 may be constructed of the same play list 126. That is, especially in this embodiment, the play list 126 can be shared, as shown with a plurality of arrows come out of each title play list 115 in FIG. 7.

Incidentally, the title play list 115 is stored in the disc information file 110 shown in FIG. 3 in the format of the title information table 114. On the other hand, the play list 126 is stored, not in the disc information file 110 but in the play list information file 120, in the format of the play list information table 121 in FIG. 3. The plurality of title play lists 115 and the plurality of play lists 126 are separately recorded in different areas on the optical disc 100, with the former recorded collectively in one area and with the latter recorded collectively in another area.

Figure 8A:
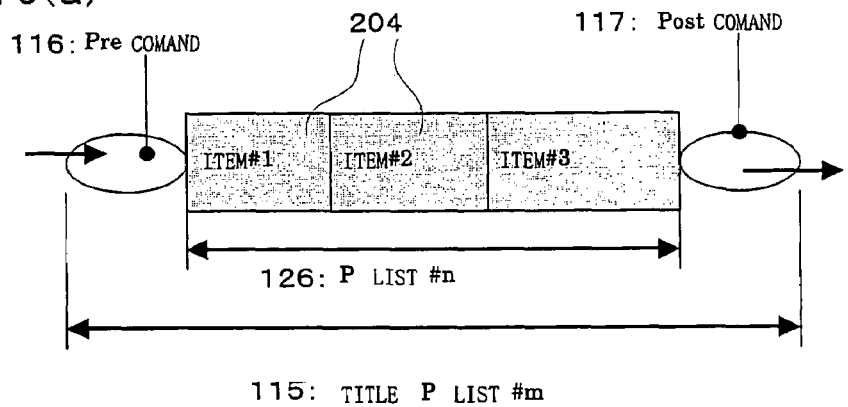
FIG. 8 are schematic diagrams conceptually showing two specific examples of a basic logical construction in the play list constituting one title shown in FIG. 7.

As shown in FIG. 7 and FIG. 8(a), each title play list 115 is identified by a title play list #m (title play list number) (m=1, 2, . . . ). Each title play list 115 includes information that specifies a play list #n (play list number) (n=1, 2, . . . ) as one example of the play list specification information that specifies a particular play list 126 to be reproduced from among the plurality of play lists 126 with its number. Moreover, the title play list 115 includes a Pre command 116 indicating a command to be executed before the reproduction of this particular play list 126, and a Post command 117 indicating a command to be executed after the reproduction of this particular play list 126.

The Pre command 116 is a command group constructed of zero, one or more statements, which give instructions for the automatic execution of audio stream selecting or the like in the reproduction, and for the execution of various-parameter setting or the like required in the reproduction. On the other hand, the Post command 117 is a command group constructed of zero, one or more statements, which give instructions for the execution of various-parameter processing for a process of ending the reproduction, and for the execution of branch-condition judging or the like.

The above-described play list 126 can be shared by specifying the play list 126 to which the same play list #n is given by using the title play list 115 to which a different title play list #m is given. Moreover, even in the case of specifying the same play list 126, changing the Pre command 116 or the Post command 117 makes it possible to construct the different title 200.

In each title 200, the plurality of title play lists 115 may have a sequential structure or a branch structure, which will be described later with reference to FIG. 8(b) to FIG. 8(d).

Moreover, as shown in FIG. 7 and FIG. 8(a), each play list 126 is logically constructed of one or a plurality of Items (i.e., the play items) 204. In each play list 126, the plurality of Items 204 may have the sequential structure or the branch structure. Moreover, one Item 204 can be referred to from the plurality of play lists 126.

In FIG. 7, the reproduction range of the TS object 142 is logically specified by the above described IN point information and OUT point information written in the Item 204. Then, by referring to object information 130d with respect to the reproduction range logically specified, the reproduction range of the TS object 142 is physically specified. Here, the object information 130d includes various information to reproduce the TS object 142, such as the attribute information of the TS object 142 and EP (Entry Pass) map information 134d required for a data search in the TS object 142 (incidentally, the ES map table 134 shown in FIG. 3 includes a plurality of such EP map information 134d).

When reproducing the TS object 142 by an information recording/reproducing apparatus, which will be described later, a physical address to be reproduced in the TS object 142 is obtained from the Item 204 and the object information 130d, and the desired elementary stream is reproduced.

In this embodiment, as described above, the title 200 is logically constructed by using the title play list 115 and the like, and further, the association from the logical hierarchy to the object hierarchy of the reproduction sequence is made by the IN point information and the OUT point information described in the Item 204 and by the EP map information 134d described in the ES map table 134 (refer to FIG. 3) of the object information 130d, which enables the elementary stream to be reproduced.

Now, the function of the title play list 115 and the like are explained with the type of the title 200, with reference to FIG. 8. Incidentally, in FIG. 8(b) to FIG. 8(d), a play list number i in the play list information file 120 (refer to FIG. 3) is described as "P list #1", "P list #2", . . . "P list #i" (i=1, 2, . . . ) in each block indicating the play list 126.

Especially in this embodiment, the title 200 is classified broadly into two categories: "one title play list type" and "a plurality of title play lists type", and the latter is further categorized into a "sequential type" and a "branch type".

Figure 8B:
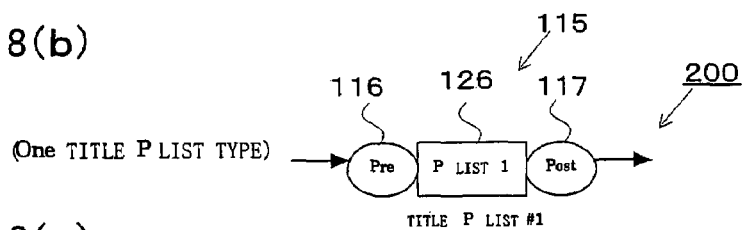

As shown in FIG. 8(b), the title 200 of the "one title play list type" is constructed simply by one title play list 115 (title play list #1). Its detailed construction is as explained with reference to FIG. 8(a). In the example of FIG. 8(b), a "play list #1 (P list #1)" is reproduced.

Figure 8C:
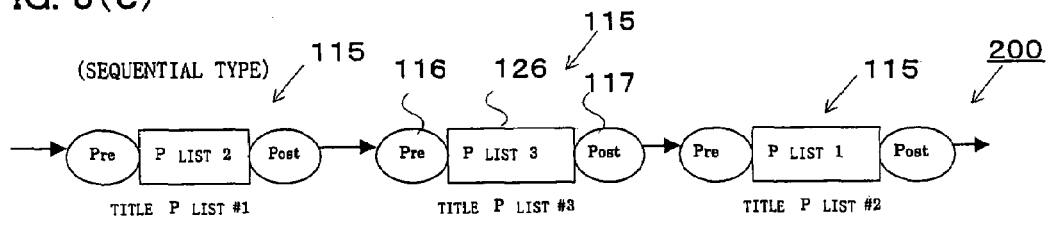

As shown in FIG. 8(c), the title 200 of the "sequential type" is constructed such that the plurality of title play lists 115 (title play lists #1, #3, and #2) are sequentially reproduced by following the reproduction time axis. The detailed construction of each title play list 115 is as explained with reference to FIG. 8(a). In this case, each title play list 115 can arbitrarily specify the play list 126. In FIG. 8(c), independently of the storing order of the play lists 126 in the play list information table 121 (refer to FIG. 3), a "play list #2 (P list #2)", a "play list 3 (P list #3)", and the "play list 1 (P list #1)" are reproduced in this order.

Incidentally, FIG. 8(c) shows such a specific example that after preparing the title play list #1 and the title play list #2 in this order, the title play list #3 is added between them by editing. This kind of edit operation can be executed relatively easily by substituting the Pre command 116 and the Post command 117. Namely, it is not necessary to rearrange the title play list 115 in the title information table 114. It is enough to add the title play list #3, which is newly prepared, behind (at the bottom of) the title play list #2 in the title information table 114.

Figure 8D:
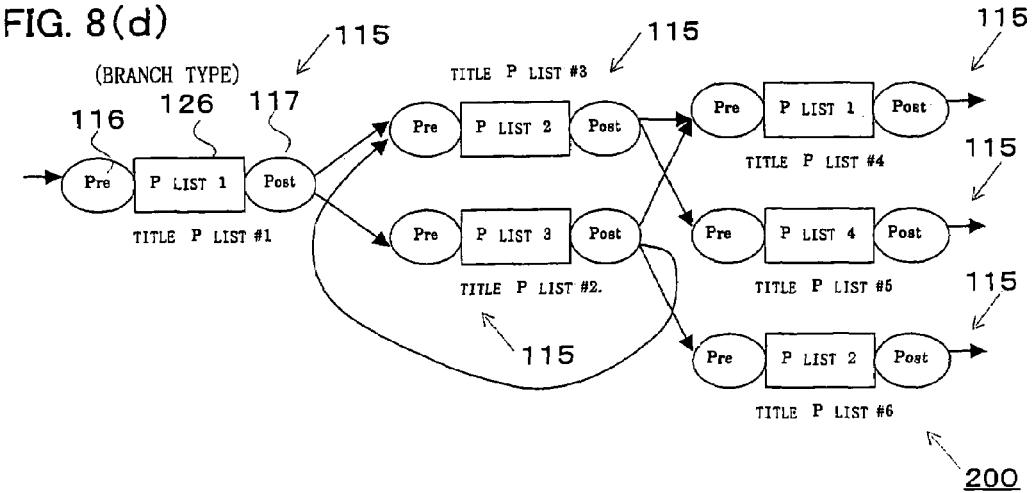

As shown in FIG. 8(d), the title 200 of the "branch type" is constructed of the plurality of title play lists 115 (title play lists #1 to #6). The branch which is based on the Post command 117 constituting the title play list #1 causes the play list 126 which is specified by the title play list #3 or #2 (the "play list #2" or the "play list #3") to be selectively reproduced following the play list 126 (the "play list #1") which is specified by the title play list #1. Moreover, the branch which is based on the Post command 117 constituting the title play list #3 causes the play list 126 which is specified by the title play list #4 or #5 to be selectively reproduced following the play list 126 which is specified by the title play list #3. On the other hand, it is constructed such that the branch which is based on the Post command 117 constituting the title play list #2 causes the play list 126 which is specified by the title play list #4, #6, or #3 to be selectively reproduced following the play list 126 which is specified by the title play list #2. The detailed construction of each title play list 115 is as explained with reference to FIG. 8(a). On this account, it is possible to select one of the play lists 126 with an interactive operation by an audience, for example.

Incidentally, the branch from the title play list #2 to the title play list #3 or #6 in FIG. 8(d) indicates that even the same play list 126 (the "play list #2") has different branch conditions after its reproduction. This shows one example of preparing different title play lists 115 by using the same play list 126.

As described above in detail, according to this embodiment, in any case of the titles of the types shown in FIG. 8(b) to FIG. 8(d), it is possible to combine the same play list 126 with a different Pre command 116 and a different Post command 117 to prepare the title play list 115, and by this combination, it is possible to construct various titles 200 using the same play list 126. Moreover, since the same play list 126 can be specified by the plurality of title play lists 115, even by this specification, it is possible to construct various titles 200 using the same play list 126

Moreover, in this embodiment, the multiplexing and recording is performed on the optical disc 100 in units of the TS packet 146, and because of this, it is possible to multiplex-and-record onto the optical disc 100 the transport stream including many elementary streams as shown in FIG. 2(b). According to this embodiment, in the case of recording digital broadcasting onto the optical disc 100, a plurality of shows or programs can be recorded at the same time within the limit of the record rate. Here, it employs a method of multiplexing the plurality of shows or programs and recording them into one TS object 142.

The embodiment of an information recording/reproducing apparatus executable this kind of record processing will be explained hereinafter.

(Information Recording/Reproducing Apparatus)

Figure 9:
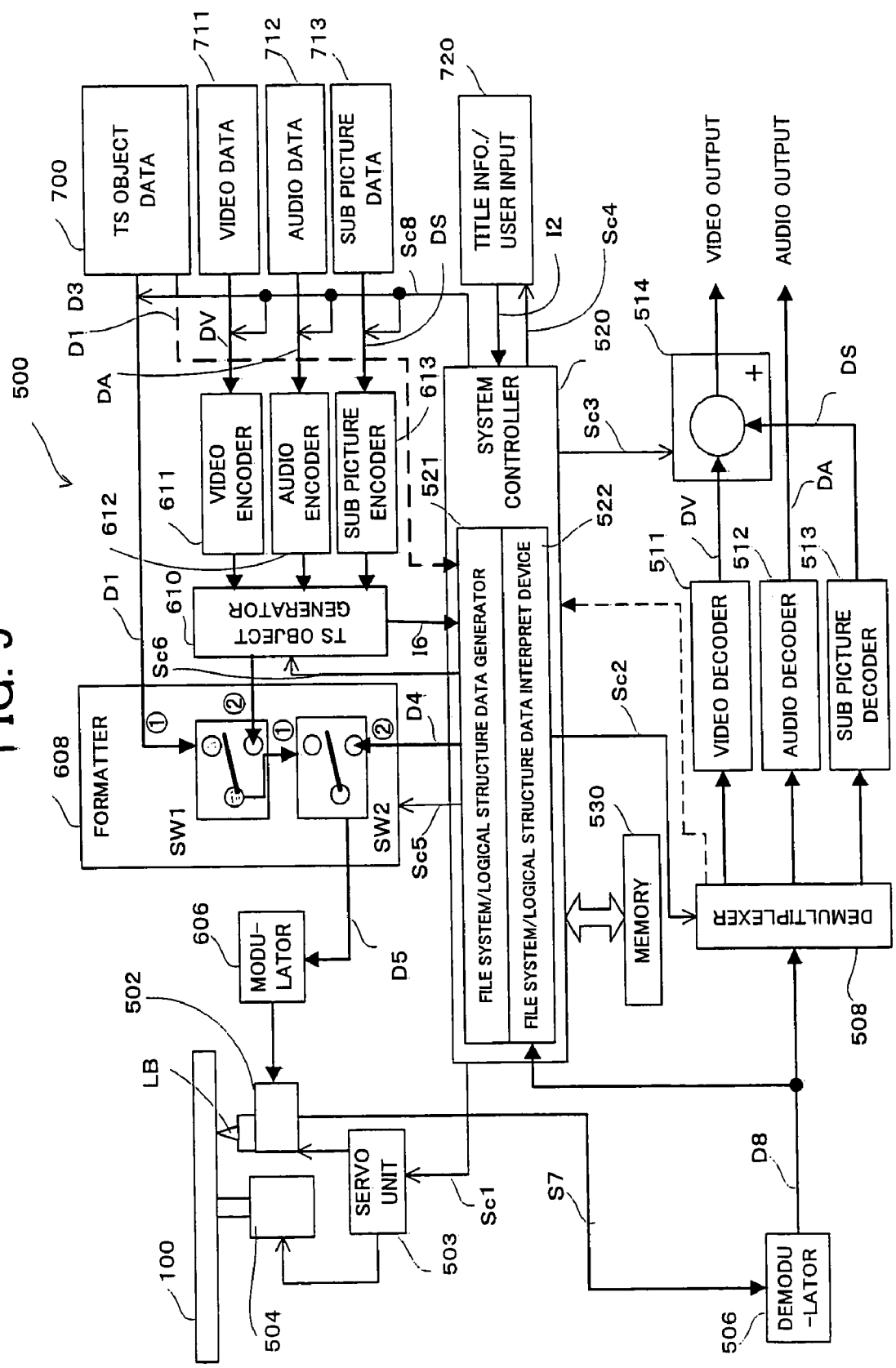
FIG. 9 is a block diagram showing an information recording/reproducing apparatus related to the embodiment of the present invention.

Next, the embodiment of the information recording/reproducing apparatus of the present invention will be explained with reference to FIG. 9 to FIG. 14. FIG. 9 is a block diagram of the information recording/reproducing apparatus, and FIG. 10 to FIG. 14 are flow charts showing its operation.

In FIG. 9, an information recording/reproducing apparatus 500 is classified broadly into a reproduction system and a record system, can record information onto the optical disc 100 described above, and can reproduce the information recorded on this. In this embodiment, the information recording/reproducing apparatus 500 is for recording and reproducing as described above, but it is possible to construct an embodiment of the recording apparatus of the present invention from the record system part of the information recording/reproducing apparatus 500. On the other hand, it is possible to construct an embodiment of the reproducing apparatus of the present invention from the reproduction system part of the information recording/reproducing apparatus 500.

The information recording/reproducing apparatus 500 is provided with: an optical pickup 502; a servo unit 503; a spindle motor 504; a demodulator 506; a demultiplexer 508; a video decoder 511; an audio decoder 512; a sub picture decoder 513; an adder 514; a system controller 520; a memory 530; a modulator 606; a formatter 608; a TS object generator 610; a video encoder 611; an audio encoder 612; and a sub picture encoder 613. The system controller 520 is provided with a file system/logical structure data generator 521; and a file system/logical structure data interpret device 522. Moreover, the memory 530 and a user interface 720 for the user input of the title information and the like are connected to the system controller 520.

Among these constitutional elements, the demodulator 506, the demultiplexer 508, the video decoder 511, the audio decoder 512, the sub picture decoder 513, and the adder 514 constitute the reproduction system, mostly. On the other hand, among these constitutional elements, the modulator 606, the formatter 608, the TS object generator 610, the video encoder 611, the audio encoder 612, and the sub picture encoder 613 constitute the record system, mostly. The optical pickup 502, the servo unit 503, the spindle motor 504, the system controller 520, the memory 530, and the user interface 720 for the user input of the title information and the like are shared for both the reproduction system and the record system, mostly. Moreover, a TS object data source 700, a video data source 711, an audio data source 712, and a sub picture source 713 are prepared for the record system. The file system/logical structure data generator 521 installed in the system controller 520 is mainly used in the record system, and the file system/logical structure data interpret device 522 is mainly used in the reproduction system.

The optical pickup 502 irradiates a light beam LB, such as a laser beam, onto the optical disc 100 with a first power as a reading light when reproducing, and with a second power as a writing light when recording while modulating it. The servo unit 503 is controlled by a control signal Sc1 outputted from the system controller 520 when reproducing and recording, and it performs a focus servo, a tracking servo, and the like at the optical pickup 502, as well as performing a spindle servo at the spindle motor 504. The spindle motor 504 is constructed to spin the optical disc 100 at a predetermined speed while receiving the spindle servo by the servo unit 503.

(i) Structure and Operation in Record System

Next, the specific structure and operation of each constitutional element constituting the record system in the information recording/reproducing apparatus 500 will be explained case by case, with reference to FIG. 9 to FIG. 13.

(i-1) The Case of Using the Already Prepared TS Object

This case will be explained with reference to FIG. 9 and FIG. 10.

In FIG. 9, the TS object data source 700 is provided with a record storage, such as a video tape and a memory, and it stores TS object data D1.

Figure 10:
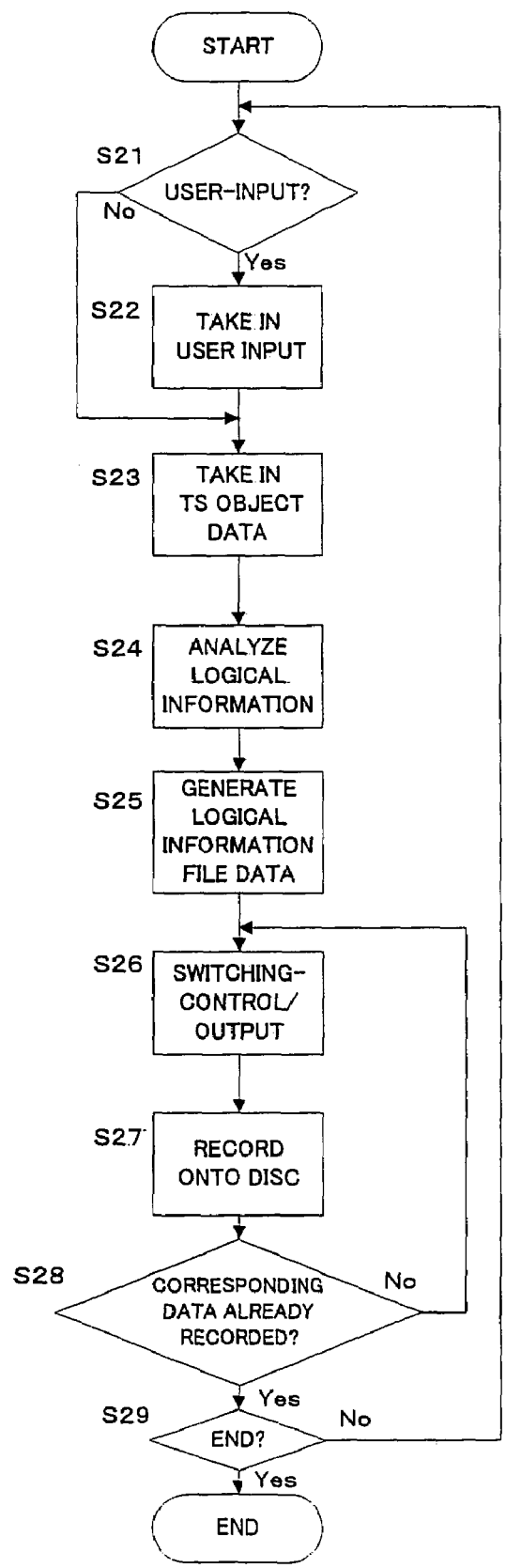
FIG. 10 is a flow chart showing a record operation (part 1) of the information recording/reproducing apparatus in the embodiment.

In FIG. 10, firstly, the information about each title (e.g. the structure content of the play list and the like) logically constructed on the optical disc 100 using the TS object data D1 is inputted from the user interface 720 to the system controller 520, as a user input I2 of the title information and the like. Then, the system controller 520 takes in the user input I2 of the title information and the like obtained from the user interface 720 (step S21: Yes and step S22). In this case, the user interface 720 is controlled by a control signal Sc4 from the system controller 520, and it can perform input processing according to the content to be recorded, such as choosing through a title menu screen. Incidentally, in the case where the user input has been already performed or the like (step S21: No), this processing is omitted.

Then, the TS object data source 700 is controlled by a control signal Sc8 giving an instruction for reading out the data from the system controller 520, and outputs the TS object data D1. Then, the system controller 520 takes in the TS object data D1 from the TS object source 700 (step S23), and performs the analysis of the data array of the TS object data D1 (e.g. a record data length and the like), the analysis of each elementary stream structure (e.g. understanding of ES_PID (Elementary Stream·Packet Identification number) as described later), and the like, by virtue of a TS analysis function of the file system/logical structure data generator 521, for example, on the basis of the PAT, the PMT, and the like packetized as well as the video data and the like as described above (step S24).

Then, the system controller 520 prepares the disc information file 110, the play list information file 120, the object information file 130, and the file system 105 (refer to FIG. 3), as logical information file data D4, by virtue of the file system/logical structure data generator 521, from the user input I2 of the taken-in title information and the like and from the analysis results of the data array of the TS object data D1 and each elementary stream (step S25). The memory 530 is used when preparing the logical information file data D4 described above.

Incidentally, such a variation that the data about the data array of the TS object data D1, the data about the construction information of each elementary stream, and the like are prepared in advance, is apparently and variously conceivable. Such a variation is also within the scope of the embodiment.

In FIG. 9, the formatter 608 is a device for performing a data array format to store onto the optical disc 100 the TS object data Dl and the logical information file data D4. More specifically, the formatter 608 is provided with a switch Sw1 and a switch Sw2 and is switching-controlled by a switch control signal Sc5 from the system controller 520. When formatting the TS object data D1, it connects the switch Sw1 to a ① side and the switch Sw2 to the ① side so as to output the TS object data D1 from the TS object data source 700. Incidentally, the transmission control of the TS object data D1 is performed by the control signal Sc8 from the system controller 520. On the other hand, when formatting the logical information file data D4, the formatter 608 is switching-controlled by the switch control signal Sc5 from the system controller 520, and connects the switch Sw2 to a ② side so as to output the logical information file data D4.

In a step S26 in FIG. 10, (i) the logical information file data D4 from the file system/logical structure data generator 521 in the step S25 or (ii) the TS object data D1 from the TS object data source 700 is outputted through the formatter 608 by the switching-control by the formatter 608 as constructed above (step S26).

The selection output from the formatter 608 is transmitted to the modulator 606 as disc image data D5, is modulated by the modulator 606, and is recorded onto the optical disc 100 through the optical pickup 502 (step S27). The system controller 520 also executes the disc record control in this case.

Then, if both the logical information file data D4 generated in the step S25 and the corresponding TS object data D2 have not been completely recorded yet, the operational flow returns to the step S26, continuing to the record (step S28: No). Incidentally, there is no preference in the record order of the logical information file data D4 and the corresponding TS object data D2.

On the other hand, if the both have been already recorded, it is judged whether or not the record on the optical disc 100 is supposed to be ended, on the basis of the presence or absence of an end command (step S29). If not supposed to be ended (step S29: No), the operational flow returns to the step S21, continuing the record processing. On the other hand, if supposed to be ended (step S29: Yes), a series of record processing ends.

As described above, the information recording/reproducing apparatus 500 performs the record processing in the case of using the already prepared TS object.

Incidentally, the example in FIG. 10 shows that the logical information file data D4 and the corresponding TS object data D2 are outputted in the step S26, after preparing the logical information file data D4 in the step S25. However, it is also possible to execute the output of the TS object data D2 and/or the record of the TS object data D2 onto the optical disc 100 before the step S25, and after or in parallel with this recording, it is possible to generate and record the logical information file data D4.

(i-2) The Case of Receiving and Recording the Transport Stream on Air

Figure 11:
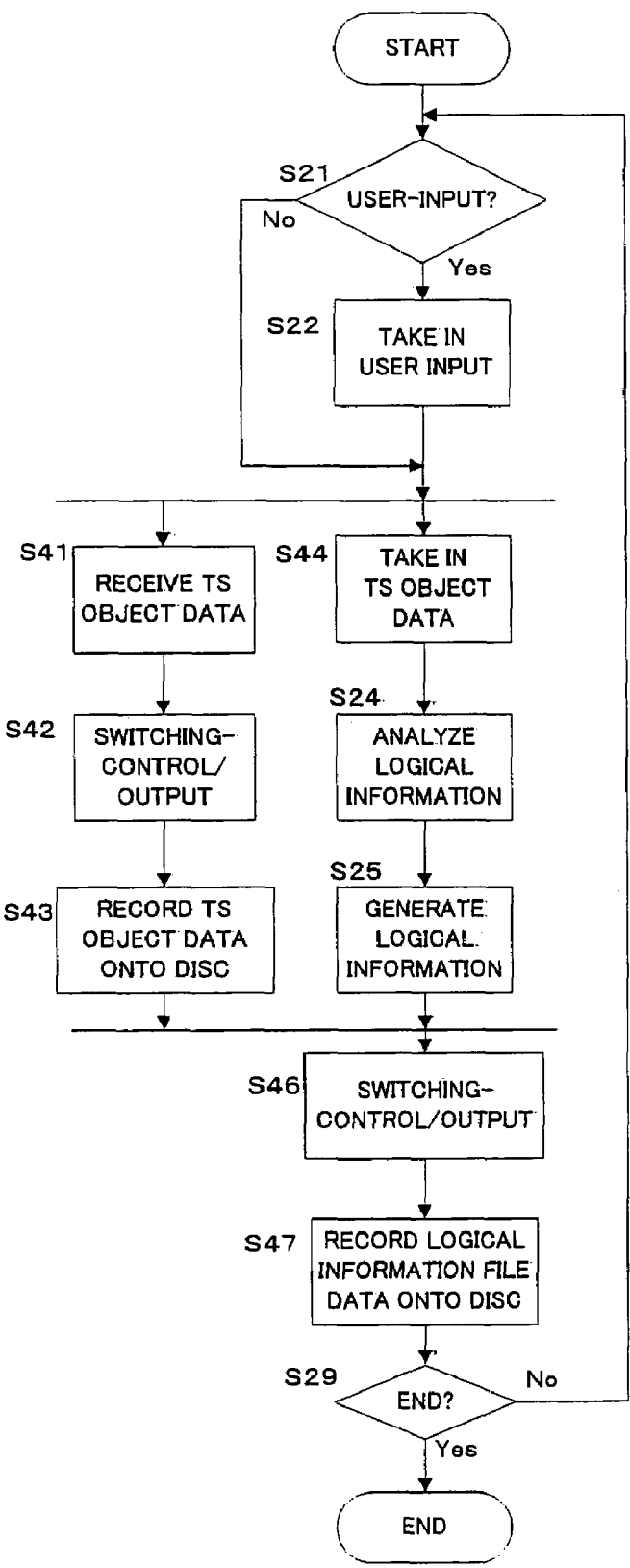
FIG. 11 is a flow chart showing a record operation (part 2) of the information recording/reproducing apparatus in the embodiment.

This case will be explained with reference to FIG. 9 and FIG. 11. Incidentally, in FIG. 11, the same steps as those in FIG. 10 have the same step reference numbers, and their explanation will be omitted as occasion demands.

Again, in this case, the similar processing is performed, as is "the case of using the already prepared TS object" described above. Therefore, focusing on the differences from this case, the explanation will be done hereinafter.

In the case of receiving and recording the transport stream on air, or the transport stream being broadcasted, the TS object data source 700 is provided with a receiver (set top box) for receiving the digital broadcast on air, for example, receives the TS object data D1, and transmits it to the formatter 608 in real time (step S41). At the same time, reception information D3 (i.e. information corresponding to the data transmitted through the receiver and the interface of the system controller 520) including the program construction information and the ES_PID information, as described later, which are deciphered upon receiving is taken into the system controller 520 and is stored into the memory 530 (step S44).

In the meantime, the TS object data D1 outputted to the formatter 608 is outputted to the modulator 606 by the switching-control of the formatter 608 (step S42), and is recorded onto the optical disc 100 (step S43).

Along with these operations, using the program construction information and the ES_PID information included in the reception information D3 taken-in upon receiving and stored in the memory 530, the file system/logical structure data generator 521 prepares the logical information file data D4 (step S24 and step S25). Then, after completing the record of a series of the TS object data D1, this logical information file data D4 is additionally recorded onto the optical disc 100 (step S46 and step S47). Incidentally, these step S24 and step S25 may be performed after the step S43.

Moreover, as the occasion demands (e.g. in the case of editing one portion of the title, or the like), by adding the user input I2 of the title information and the like from the user interface 720 to the program construction information and the ES_PID information stored in the memory 530, it is possible to prepare the logical information file data D4 by the system controller 520 and additionally record this onto the optical disc 100.

As described above, the information recording/reproducing apparatus 500 performs the record processing in the case of receiving the transport stream on air and recording it in real time.

Incidentally, if all the reception data obtained when broadcasting is once stored into an archive apparatus, and then, if this is used as the TS object source 700, the same processing as that in "the case of using the already prepared TS object" will do.

Figure 12:
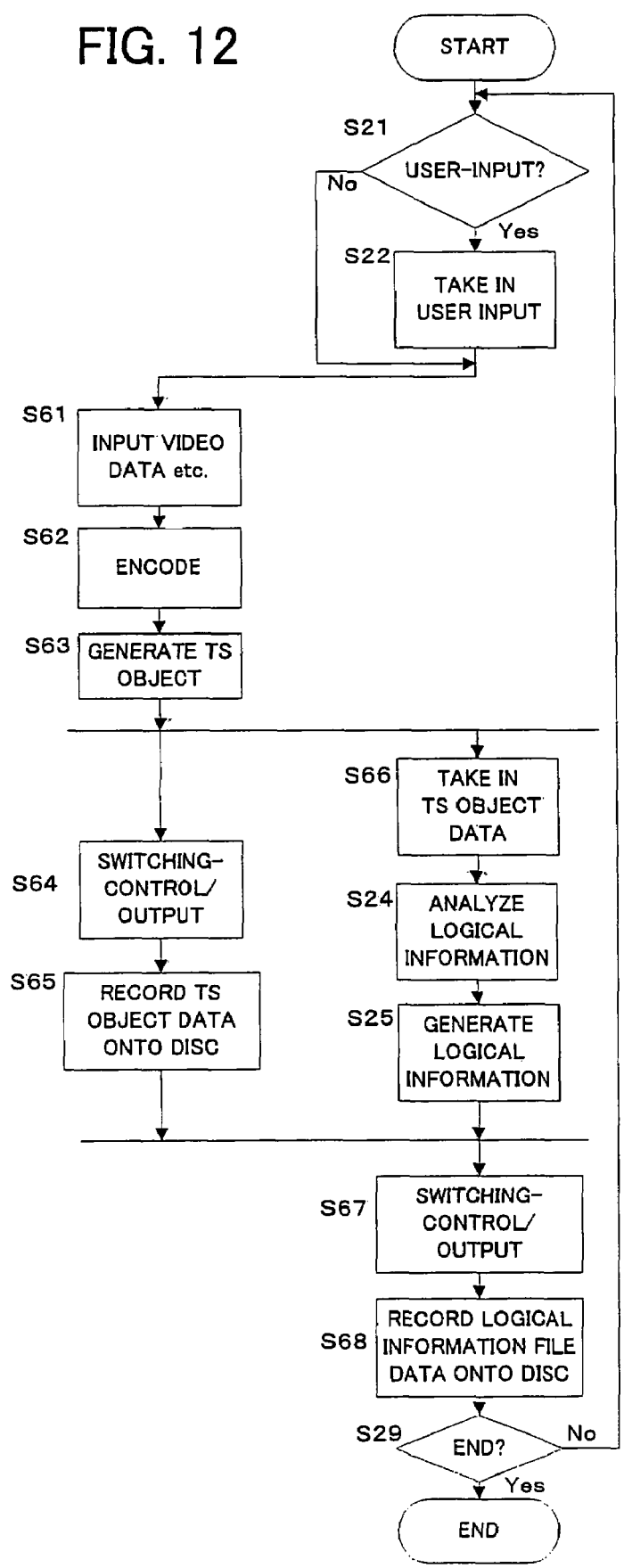
FIG. 12 is a flow chart showing a record operation (part 3) of the information recording/reproducing apparatus in the embodiment.

(i-3) The Case of Recording the Video Data, the Audio Data, and the Sub Picture Data This case will be explained with reference to FIG. 9 and FIG. 12. Incidentally, in FIG. 12, the same steps as those in FIG. 10 have the same step reference numbers, and their explanation will be omitted as occasion demands.

In the case of recording the video data, the audio data, and the sub picture data, which are individually prepared in advance, the video data source 711, the audio data source 712, and the sub picture data source 713 are individually provided with the record storage, such as a video tape and a memory, and store a video data DV, an audio data DA, and a sub picture data DS, respectively.

These data sources are controlled by the control signal Sc8 giving an instruction for reading out the data from the system controller 520, and they transmit the video data DV, the audio data DA, and the sub picture data DS, to the video encoder 611, the audio encoder 612, and the sub picture encoder 613, respectively (step S61). Then, the video encoder 611, the audio encoder 612, and the sub picture encoder 613 execute a predetermined type of encode processing (step S62).

The TS object generator 610 is controlled by a control signal Sc6 from the system controller 520 and converts the data encoded in this manner to the TS object data constituting the transport stream (step S63). In this case, the data array information of each TS object data (e.g. a record data length and the like) and the construction information of each elementary stream (e.g. the ES_PID, as described later, and the like) are transmitted from the TS object generator 610 as information I6 to the system controller 520 and are stored into the memory 530 (step S66).

On the other hand, the TS object data generated by the TS object generator 610 is transmitted to the ② side of the switch Sw1 of the formatter 608. Namely, when formatting the TS object data from the TS object generator 610, the formatter 608 is switching-controlled by the switch control signal Sc5 from the system controller 520 to change the switch Sw1 to the ② side and the switch Sw2 to the ① side, thereby outputting the TS object data (step S64). Then, this TS object data is recorded onto the optical disc 100 through the modulator 606 (step S65).

Along with these operations, using the data array information of each TS object data and the construction information of each elementary stream taken into the memory 530 as the information I6, the file system/logical structure data generator 521 prepares the logical information file data D4 (step S24 and step S25). Then, after completing the record of a series of the TS object data D1, this is additionally recorded onto the optical disc 100 (step S67 and step S68). Incidentally, the step S24 and the step S25 may be processed after the step S65.

Moreover, as the occasion demands (e.g. in the case of editing one portion of the title), by adding the user input I2 such as the title information and the like form the user interface 720 onto these information stored in the memory 530, it is possible to prepare the logical information file data D4 with the file system/logical structure generator 521 and additionally record this onto the optical disc 100.

As described above, the information recording/reproducing apparatus 500 performs the record processing in the case of the recording the video data, the audio data, and the sub picture data, which are individually prepared in advance.

Incidentally, this record processing is applicable even when recording an arbitrary content the user has.

(i-4) The Case of Recording the Data by Authoring

Figure 13:
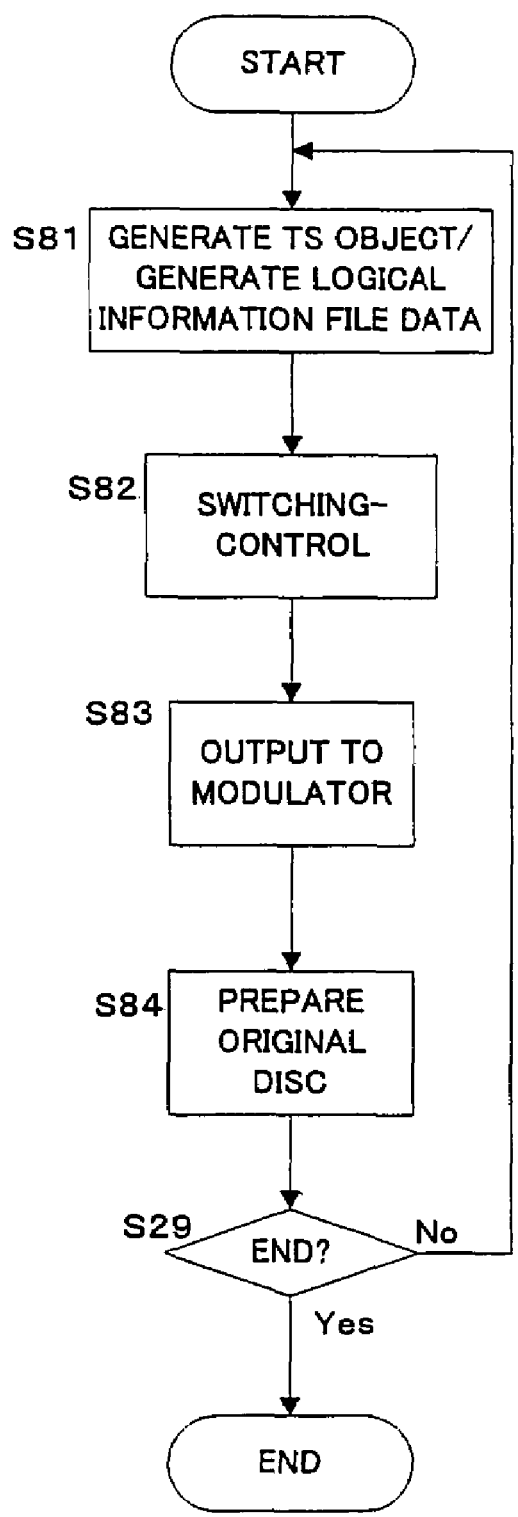
FIG. 13 is a flow chart showing a record operation (part 4) of the information recording/reproducing apparatus in the embodiment.

This case will be explained with reference to FIG. 9 and FIG. 13. Incidentally, in FIG. 13, the same steps as those in FIG. 10 have the same step reference numbers, and their explanation will be omitted as occasion demands.

In this case, by combining the above described three types of record processing in the three cases, an authoring system generates the TS object, the logical information file data, and the like in advance (step S81), and then completes the processing of switching-control performed at the formatter 608 (step S82). Then, the information obtained by this operation is transmitted to the modulator 606 equipped in front of and/or behind an original disc cutting machine, as the disc image data D5 (step S83), and this cutting machine prepares the original disc (step S84).

Especially in this embodiment, in any case of the record operations explained with reference to FIG. 9 to FIG. 13, if another title 200 obtained by another different reproduction procedure is newly added, the above-descried title play list 115 (refer to FIG. 8) as well as other logical information related thereto are taken into the system controller 520 by the user interface 720 as one portion of the user input I2 of the title information or the like. Then, as is the above-described record procedure, the logical information file data D4 corresponding to the disc information file 110 including a new title play list 115 is generated by the file system/logical structure data generator 521 on the basis of the user input I2 of the taken-in title information and the like and on the basis of the analysis results of the data array of the TS object data 142 and each elementary stream. Then, this data D4 is outputted to the formatter 608. In this case, if it is necessary to prepare a new play list 126, the newly addition may be performed even for the play list information file 120 or the object information file 130 to generate the logical information file data D4. The record procedure after this is as described above, in any case of the record processing.

(ii) Structure and Operation in Reproduction System

Next, the specific structure and operation of each constitutional element constituting the reproduction system in the information recording/reproducing apparatus 500 will be explained with reference to FIG. 9 and FIG. 14.

The user interface 720 inputs the title to be reproduced, its reproduction condition, and the like to the system controller 520 as the user input I2 of the title information and the like. In this case, the user interface 720 is controlled by the control signal Sc4 from the system controller 520, and it can perform the input processing according to the content to be reproduced, such as choosing through a title menu screen.

Responding to this, the system controller 520 controls the disc reproduction with respect to the optical disc 100, and the optical pickup 502 transmits a reading signal S7 to the demodulator 506.

The demodulator 506 demodulates a recorded signal recorded on the optical disc 100 from this reading signal S7, and outputs it as demodulated data D8. The logical information file data (i.e. the file system 105, the disc information file 110, the P list information file 120, and the object information file 130, shown in FIG. 3) included in this demodulated data D8 as being a not-multiplexed information part is supplied to the system controller 520. On the basis of this logical information file data, the system controller 520 executes various reproduction control, such as processing of determining a reproduction address and controlling the optical pickup 502.

On the other hand, as for the TS object data included in the demodulated data D8 as being a multiplexed information part, the demultiplxer 508 is controlled by a control signal Sc2 from the system controller 520 to demultiplex the TS object data. Here, the control signal Sc2 is transmitted so as to start demultiplexing when completing an access to a reproduction position address by the reproduction control of the system controller 520.

The demultiplexer 508 transmits and supplies the video packet, the audio packet, and the sub picture packet, to the video decoder 511, the audio decoder 512, and the sub picture decoder 513, respectively. Then, the video data DV, the audio data DA, and the sub picture data DS are respectively decoded.

Incidentally, the packets included in the transport stream, in each of which the PAT or the PMT is packetized as shown in FIG. 6, are respectively included as a part of the demodulated data D8; however, they are discarded or abandoned at the demultiplexer 508.

The adder 514 is controlled by a control signal Sc3 giving an instruction of the mixing from the system controller 520, and mixes or superimposes in a predetermined timing the video data DV and the sub picture data DS, which are respectively decoded at the vide decoder 511 and the sub picture decoder 513. The result is outputted as a video output from the information recording/reproducing apparatus 500 to a TV monitor, for example.

On the other hand, the audio data DA decoded at the audio decoder 512 is outputted as an audio output from the information recording/reproducing apparatus 500 to an external speaker, for example.

Here, the specific example of a reproduction processing routine by the system controller 520 will be explained with reference to FIG. 14.

Figure 14:
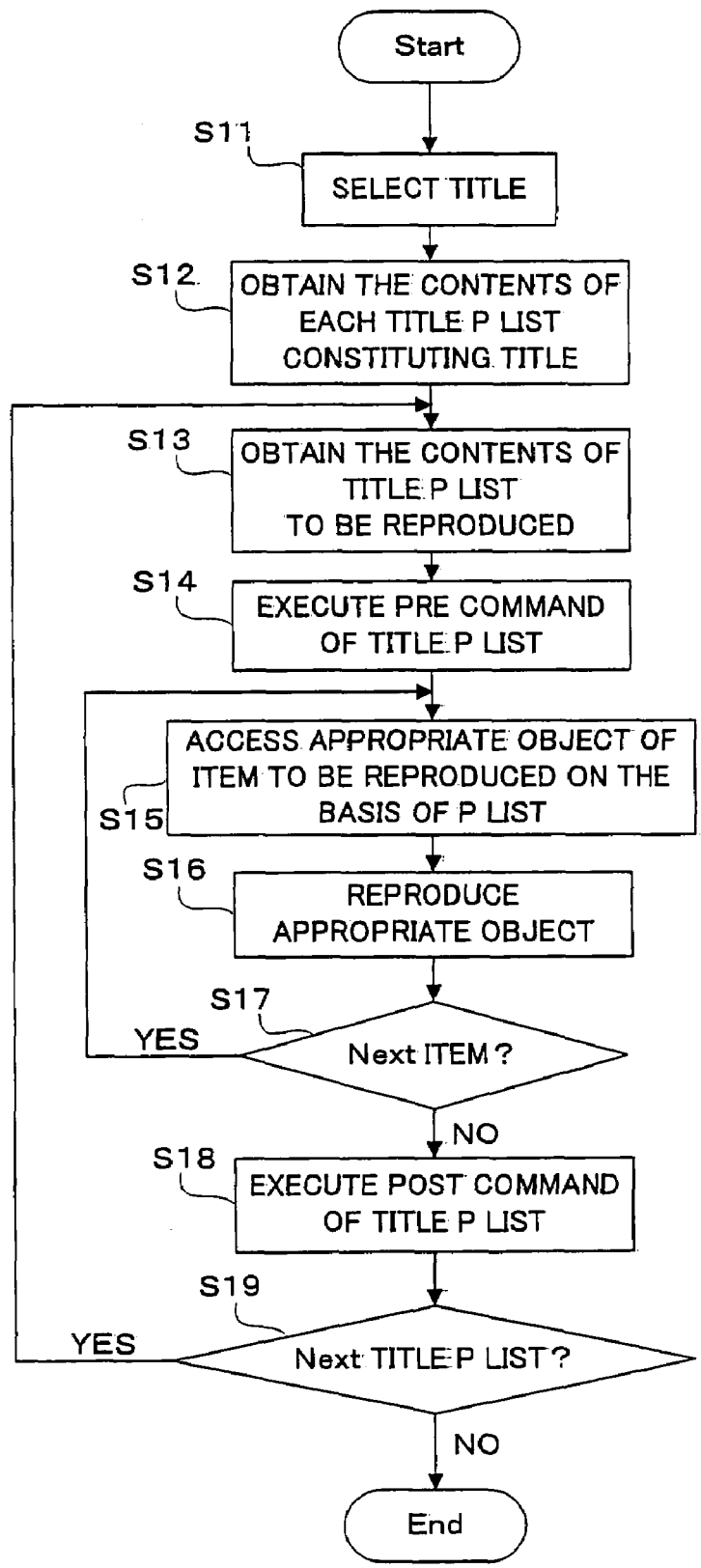
FIG. 14 is a flow chart showing a reproduction operation of the information recording/reproducing apparatus in the embodiment.

In FIG. 14, assume that as an initial condition, the recognition of the optical disc 100 in the reproduction system and the recognition of a volume structure and a file structure by the file system 105 (refer to FIG. 3) have been already completed by the system controller 520 and the file system/logical structure data interpret device 522 inside the system controller 520. Here, it will be explained the operational flow after obtaining the total number of the total titles from the disc comprehensive information 112 in the disc information file 110 and then choosing or selecting one title from among them.

Firstly, the choice or selection of the title is performed at the user interface 720 (step S11), and the system controller 520 obtains the information about the reproduction sequence from a reading result of the file system/logical structure data interpret device 522. More specifically, it obtains one or a plurality of title play lists 114 constituting the selected title 200, one or a plurality of play lists 126 specified by those title play lists 114, and the Items 204 constituting the play lists 126 (refer to FIG. 7) as the processing of the logical hierarchy (step S12).

Then, it obtains the contents of the title play list 115 to be reproduced firstly or secondly (e.g. title play list #1) from among the title play lists 115 obtained in the step S12 (step S13).

Then, it executes the Pre command 116 included in the title play list 115 obtained in the step S13 (step S14).

Then, it accesses the TS object 142 of the Item 204 to be reproduced firstly or secondly, on the basis of the play list 126 specified by the title play list 115 obtained in the step S13 (step S15). Especially in the embodiment, the AU information 132I and PU (Presentation Unit) information 302I, which will be described later, are also obtained as the information stored in the object information file 130. These obtained information allow the association or correlation of the above described logical hierarchy and the object hierarchy (refer to FIG. 7).

Then, it executes the reproduction of the TS object 142 accessed in the step S15 (step S16).

Then, it judges whether or not there is a Next Item to be reproduced on the basis of the play list 126 specified by the title play list 115 obtained in the step S13 (step S17). If there is (step S17: Yes), the operational flow returns to the step S15 to repeat the processing of the step S15 to the step S17. On the other hand, if there is not any Next Item in the step S17 (step S17: No), it executes the Post command 117 included in the title play list 115 obtained in the step S13 (step S18).

Next, it judges whether or not there is a Next title play list (Next title P list) to be reproduced in the title play list 115 obtained in the step S12 (step S19). If there is (step S19: Yes), the operational flow returns to the step S13 to repeat the processing of the step S13 to the step S19. For example, in the case of the branch type title (refer to FIG. 8(d)), since where to branch is determined after the execution of the Post command 117 in the step S18, it is possible to execute the judgment in the step S19. On the other hand, if there is not any Next title play list in the step S19 (step S19: No), it ends a series of the reproduction processing.

Incidentally, in this embodiment, it separately executes the obtainment of the contents of the title play list 115 constituting the title 200 in the step S12 and the title play list 115 to be reproduced in the step S13. However, it may execute the obtainment in the step S13 together with the obtainment in the step S12.

(Access Flow in Reproducing)

Figure 15:
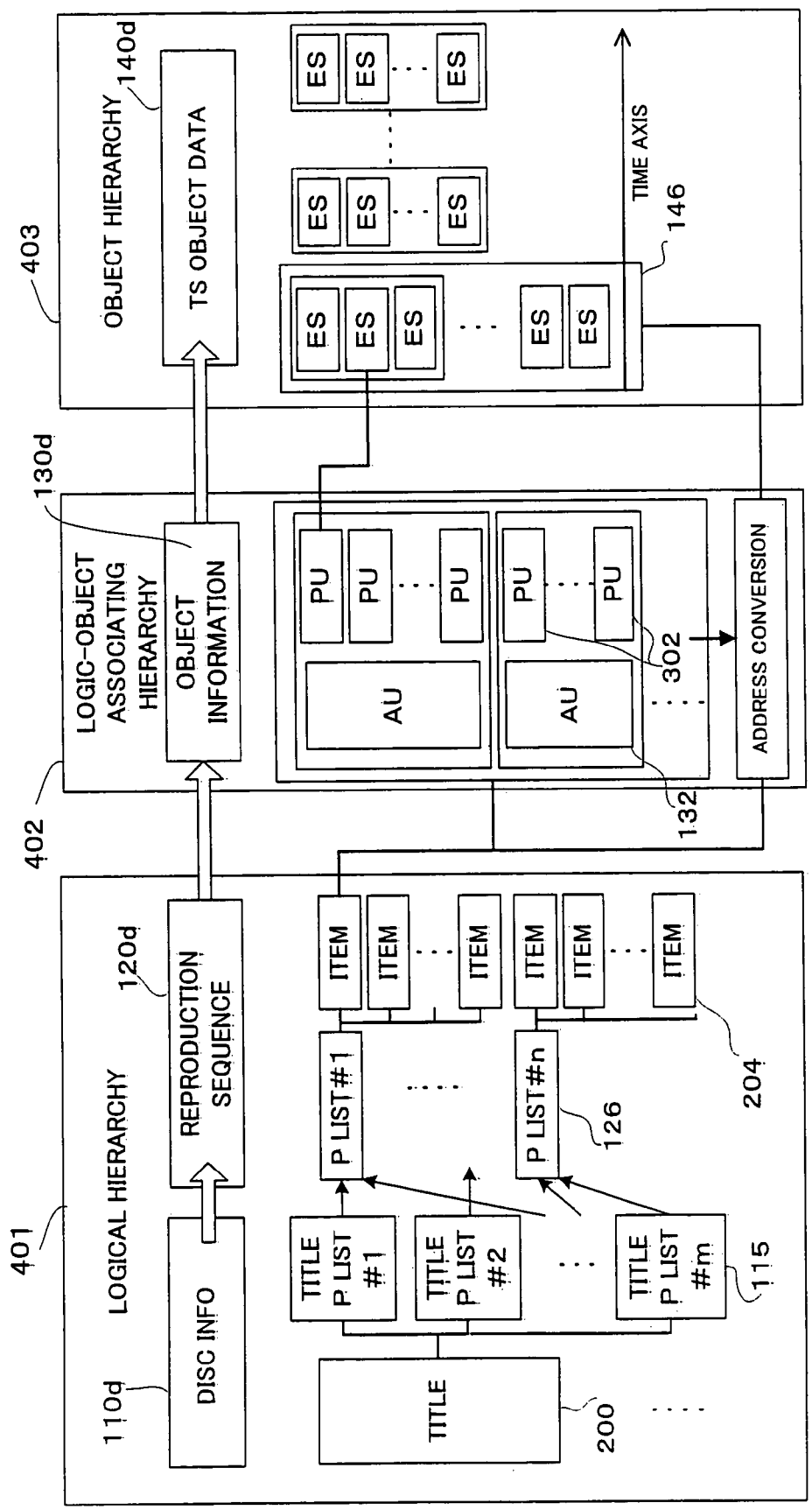
FIG. 15 is a schematic diagram conceptually showing an entire access flow in reproducing, in relation to the logical structure of the optical disc in the embodiment.

Next, the flow of the access in reproducing at the information recording/reproducing apparatus 500, which uses the title play lists 115 (title P lists #1 to #m) and the play lists 126 (P lists #1 to #n) as well as the AU information 132I and the PU information 302I, as one of the features of this embodiment, will be explained as well as the logical structure of the optical disc 100. FIG. 15 is a schematic diagram conceptually showing an entire flow of the access in reproducing, in relation to the logical structure of the optical disc 100.

In FIG. 15, the logical structure of the optical disc 100 is categorized broadly into the following three hierarchies: a logical hierarchy 401; an object hierarchy 403; and a logic-object associating hierarchy 402 mutually associating those two hierarchies.

Among them, the logical hierarchy 401 is a hierarchy that logically specifies various logical information to reproduce the desired title when reproducing, as well as the play list to be reproduced and its construction content. In the logical hierarchy 401, disc information 110d indicating the entire titles 200 and the like on the optical disc 100 is written within the disc information file 110 (refer to FIG. 3), and further, reproduction sequence information 120d of the entire contents on the optical disc 100 is written within the play list information file 120 (refer to FIG. 3). More specifically, as the disc information 110d, the construction of one or a plurality of title play lists 115 constituting each title 200 is written as one portion of the title information table 114 (refer to FIG. 3). Moreover, as the reproduction sequence information 120d, the construction of one or a plurality of play lists 126 is written, each of whose play list numbers is specified by the title play list 115. The construction of one or a plurality of Items 204 is written in each play list 126. Then, in accessing at the time of the reproduction, the logical hierarchy 401 as described above specifies the title 200 to be reproduced and the title play list 115 constituting this. By this, the play list 126 corresponding to the title 200, and the above-described Pre command 116 and Post command 117 (refer to FIG. 8) are specified, and further the Item 204 corresponding to this play list 126 is specified.

Therefore, according to this embodiment, by specifying the same play list 126 using the plurality of title play lists 115, it is possible to construct various titles 200 in the logical hierarchy 401 using the same play list 126. Moreover, by combining the same play list 126 with the different Pre command 116 and the different Post command 117 as described above to prepare the title play list 115, it is also possible to construct various titles 200 in the logical hierarchy 401 using the same play list 126.

Incidentally, more specific data constructions of the disc information file 110 for storing the title play list 115, the play list information file 120 for storing the play list 126, and the like will be explained with reference to FIG. 17 to FIG. 21 later.

Then, the logic-object associating hierarchy 402 is a hierarchy that specifies the attribute and the physical storing address of the TS object data 140d to be reproduced, so as to specify the combination and/or the construction of the TS object data 140d as being the entity data and perform an address conversion to the object hierarchy 403 from the logical hierarchy 401, on the basis of the information specified in the logical hierarchy 401 as described above. More specifically, in the logic-object associating hierarchy 402, the object information data 130d, which separates a group of the contents constituting each Item 204 into units of the AU 132 and which finely separates each AU 132 into units of the PU 302, is written in the object information file 130 (refer to FIG. 3).

Here, "the PU (Presentation Unit) 302" is a unit of associating and grouping a plurality of elementary streams for each unit of changing the reproduction. For example, the PU 302 is a unit of grouping the elementary stream packet ID (ES_PID) and the like for each vision of a "multi-vision title". If there are three audio streams in this PU 302, the user can also freely change three audio (e.g. audio in different languages and the like) while reproducing this vision.

On the other hand, "the AU (Associate Unit) 132" is a unit of associating or grouping a plurality of elementary streams, such as the video stream, in the TS object used in one title, and is a group of one or a plurality of PUs 302. More specifically, the AU 132 is a unit of grouping the elementary stream packet ID (ES_PID) for each TS object, indirectly through the PU 302. This AU 132 corresponds to a group of a plurality of shows or programs mutually having a special relationship considering the contents, for example, a plurality of shows or programs mutually changeable in multiple broadcasting and the like. Then, the PU 302 corresponds to a group of one or a plurality of elementary streams, which belong to the same AU 132 and which constitute a plurality of shows or programs mutually changeable by the user operation when reproducing.

Therefore, if the AU 132 to be reproduced is specified, and moreover, the PU 302 is specified, then the elementary stream to be reproduced is specified. Namely, even if not using the PAT nor the PMT shown in FIG. 6, it becomes possible to reproduce the desired elementary stream from among the multiplexed and recorded elementary streams from the optical disc 100.

The more specific data structure of the AU information 132I and the PU information 302I, which respectively define the AU 132 and the PU 302 described above, will be explained later with reference to FIG. 21.

Here, the elementary stream that is actually reproduced is identified or specified by the ES_PID, which is the packet ID of the elementary stream (refer to FIG. 6), from the PU information 302I. At the same time, by converting the information indicating the starting time and the ending time of the reproduction to the address information of the elementary stream, the content in a specific area (or specific time range) of a specific elementary stream is reproduced.

In this manner, in the logic-object associating hierarchy 402, the address conversion to the physical address related to each PU 302 from the logical address related to each Item 204 is executed.

Then, the object hierarchy 403 is a physical hierarchy to reproduce the actual TS object data 140d. In the object hierarchy 403, the TS object data 140d is written within the object data file 140 (refer to FIG. 3). More specifically, the TS packets 146 constituting a plurality of elementary streams (ES) are multiplexed at each time point, and the arrangement of the TS packets 146 along the time axis enables a plurality of elementary streams to be constructed (refer to FIG. 5). Then, the plurality of TS packets 146 multiplexed at each time point are associated with the PU 302 identified at the logic-object associating hierarchy 402, for each elementary stream. Incidentally, it is also possible to associate a plurality of PUs 302 with one elementary stream (e.g. to share the elementary stream related to the same audio data and/or the elementary stream related to the same sub picture data, among a plurality of changeable shows or programs).

In this manner, in the object hierarchy 403, the actual object data is reproduced using the physical address obtained by the conversion at the logic-object associating hierarchy 402.

As described above, the three hierarchies shown in FIG. 15 allow the execution of the access with respect to the optical disc 100 in reproducing.

(iii) Operation in Editing

Figure 16:
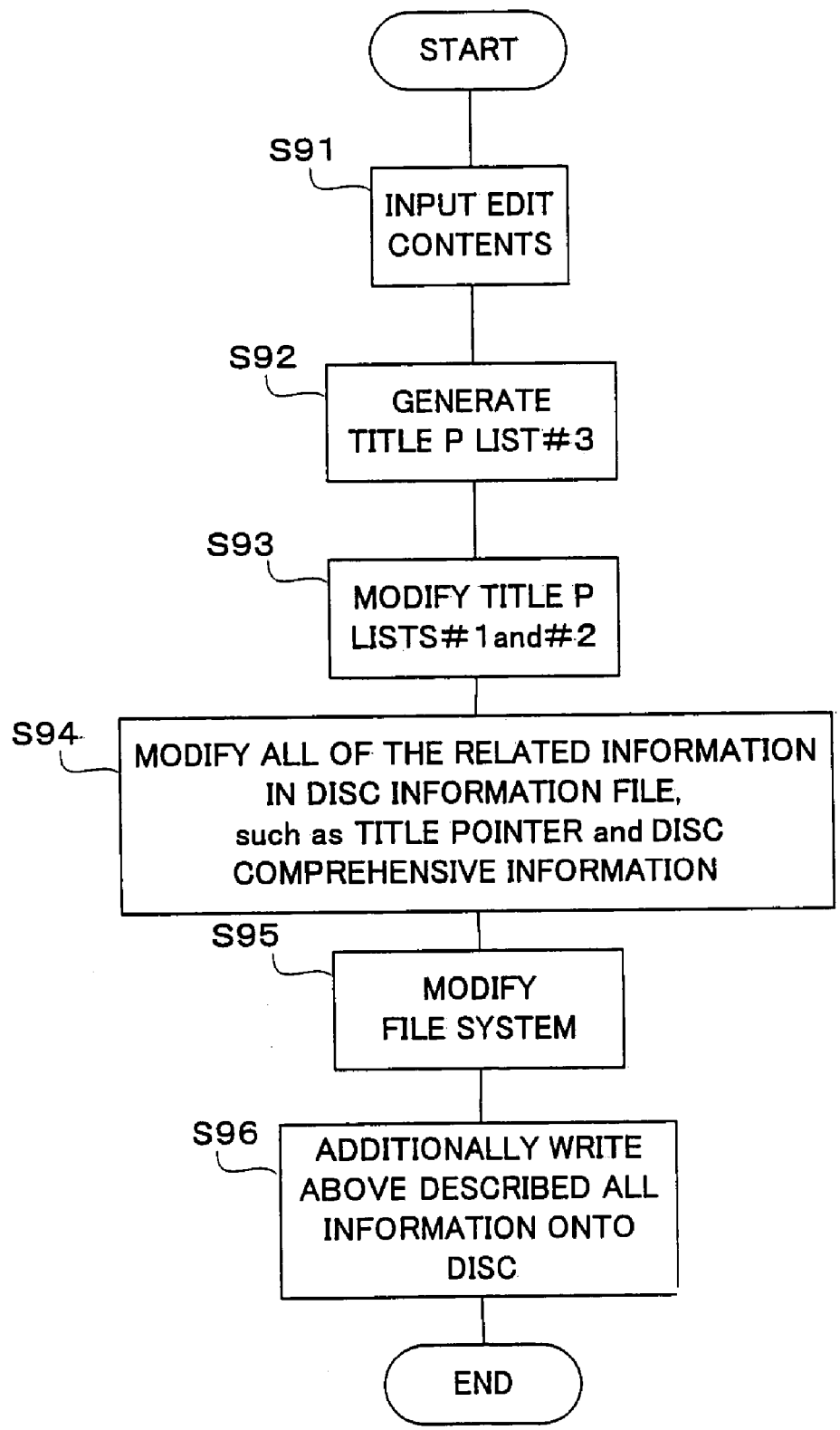
FIG. 16 is a flow chart showing an edit operation of the information recording/reproducing apparatus in the embodiment.

Next, the operation in the edit of the information recording/reproducing apparatus 500 shown in FIG. 9 will be explained with reference to FIG. 16.

Here, as a precondition, the title 200 is assumed to be completed as the title of the sequential type (refer to FIG. 8(c)) constructed of the title play lists #1 and #2. Namely, the TS object 142 related to a particular title 200 which is recorded on the optical disc 100 and the corresponding entire logical information are also assumed to be completed. Now, taking as an example the edit processing in which the title play list #3 is added, under this precondition, as the title play list 115 which is secondly reproduced of this title 200, as is the specific example shown in FIG. 8(c), the explanation will go on. Moreover, in this case, the play list 126 which is used on the title play list #3 added and the TS object 142 to be reproduced are also assumed that they have been already used at another title 200 on the optical disc 100 (e.g. at the branch type title of the embodiment as shown in FIG. 8(d)); namely, they are assumed to be on the optical disc 100 already.

Firstly, edit contents are inputted by the user interface 720 (step S91). Specifically, the additional contents of the title play list #3 are inputted as the second title play list 115 of the title 200. Then, the system controller 520 takes in these additional contents.

Next, the title play list #3 is generated by the file system/logical structure data generator 521 on the basis of the taken-in additional contents in the step S91 (step S92). Specifically, the play list number of the play list 126 used on the title play list #3, and the Pre command 116 and the Post command 117 required for the play list number are generated, and further other information is generated. In this case, the Post command 117 is generated such that the destination of the branch after the reproduction of the corresponding play list 126 is the title play list #2.

Then, the title play lists #1 and #2 are modified by the file system/logical structure data generator 521 on the basis of the additional contents taken in the step S91 (step S93). Specifically, the Pre command 116 and the Post command 117 required for the play list 126 used on the title play list #2 are generated, and further other information is generated. In this case, the Post command 117 is generated such that the destination of the branch after the reproduction of the corresponding play list 126 is nowhere. Moreover, it is not necessary to modify the play list 126 itself. In the same manner, as for the Post command 117 of the title play list #1, it is modified such that the destination of the branch after the reproduction of the corresponding play list 126 is the title play list #3.

The order of the processing in the above-described step S92 and step S93 may be opposite. By these processing, the edit of the title information table 114 stored in the disc information file 110 completes.

Moreover, all of the related information in the disc information file 110, such as the disc comprehensive information 112 and the other information 118, is modified by the file system/logical structure data generator 521, according to the title play list #3 generated in the step S91 and the title play list #3 modified in the step S92 (step S94).

Then, the file system 105 is modified by the file system/logical structure data generator 521 according to the modification of the disc information file 110 (step S95).

Then, under the control of the system controller 520, the above described all information is additionally written onto the optical disc 100 (step S96) to end a series of edit operation.

As explained above, according to this embodiment, the title 200 can be edited by generating or modifying the title play list 115 without generating or modifying the title list 126 itself, so that it is possible to perform an efficient edit operation as a whole. In addition, this way of editing can avoid the overlapping record of the same title list 126, so that it is possible to save the recording capacity of the optical disc 100, and further it is possible to try to increase reproduction-processing efficiency.

(Each Information File Structure)

Next, with reference to FIG. 17 to FIG. 21, various information files constructed on the optical disc 100 in the embodiment, i.e. the data structures of (1) the disc information file 110, (2) the play list information file 120, and (3) the object information file 130, which have been explained with reference to FIG. 3, will be explained using their own specific examples.

(1) Disc Information File:

Firstly, with reference to FIG. 17 to FIG. 19, the disc information file 110 will be explained in detail using one specific example. FIG. 17 and FIG. 18 are schematic diagrams showing specific examples of the data structure of the disc information file. FIG. 19 is a schematic diagram showing a specific example of a command table constructed in the disc information file 110.

In this specific example as shown in FIG. 17, the disc information file 110 stores therein the disc comprehensive information 112, the title information table 114, and the other information 118.

Among them, the disc comprehensive information 112 is comprehensive information, such as disc volume information indicating the serial number of one series constructed by a plurality of optical discs 100, total title number information and so on.

The title information table 114 stores therein the entire title play lists 115 constituting each title, the command table on which the Pre command 116 and the Post command 117 are written which are to be executed before and after the reproduction of each title play list 115, and the other information, e.g. information for each title, such as chapter information within the title and the like, and includes title pointer information, title #1 information, title #2 information, and so on. Here, the "title pointer information" is the storing address information of the title #n information, i.e. the storing address information indicating the storing position of the title #n information in the title information table 114, as the correspondence relationship is indicated with arrows in FIG. 17, and the "title pointer information" is written with a relative logical address. Then, this information of the number of titles in the optical disc 100 is arranged in the order of the titles as the relative logical address. Incidentally, the data amount of each storing address information may be a fixed byte or a changeable byte.

The other information 118 is information about each title, such as the title type, for example, the sequential type, the branch type, and the like, which have been already explained with reference to FIG. 8, and the total number of play lists.

Next, another specific example of the disc information file is shown in FIG. 18.

In FIG. 18, a disc information file 110' is a specific example in which the title 200 of the "1 title play list type" shown in FIG. 8(b) is written by the title #1 information, in which the title 200 of the "sequential type" is written by the title #2 information, and in which the title 200 of the "branch type" is written by the title #3 information. The basic structure of the disc information file 110' is the same as that shown in FIG. 17, in which the disc comprehensive information 112, the title information table 114, and the other information 118 are stored.

Then, especially in this embodiment, the title #1 information of the 1 title play list type is constructed of one title play list 115 (title P list #1).

The title #2 information of the sequential type is constructed of three title play lists 115 (title P lists #1 to #3). The title play list numbers here may be the same as or different from the reproduction order of the title play lists 115.

The title #3 information of the branch type is constructed of six title play lists 115 (title P lists #1 to #6). The title list numbers, except the title play list #1 which is at the head here, do not have any special meaning for the reproduction order. That is, in the case of the title of the branch type, the order of the title play lists 115 is arbitrary except the title play list 115 which is at the head. Therefore, even if adding the play list in the reconstruction processing, the edit processing, or the like of the title, it is enough to simply add the title play list number last, and while doing that, it is enough to apply a change onto each command table in the title #n information as occasion demands.

The three title information #1, #2, and #3 as constructed above is stored as the title information table 114 in the format of a table for each title in the disc information file 110'.

Next, the specific example of the command table will be explained with reference to FIG. 19.

In the specific example shown in FIG. 19, a command table 115T is constructed to include three fields, such as a command pointer 115P, a Pre command table 116T, and a Post command table 117T.

In the command pointer 115P, as the correspondence relationship is indicated with arrows in FIG. 19, the start addresses of the Pre command table 116T and the Post command table 117T are written as relative addresses, and further, the total Pre command number and the total Post command number are written. In the Pre command table 116T whose address is specified by the command pointer 115P, statements, each of which is about 2 bytes, for example, are written as a plurality of Pre commands 116 (Pre commands #1, #2, . . . ) constituting a command group. On the other hand, in the Post command table 117T whose address is specified by the command pointer 115P, statements, each of which is about 2 bytes, for example, are written as a plurality of Post commands 117 (Post commands #1, #2, . . . ) constituting a command group.

(2) Play List Information File:

Next, with reference to FIG. 20, the play list information file 120 will be explained in detail using one specific example. FIG. 20 is a schematic diagram showing one specific example of the data structure on the play list information table 121 constructed in the play list information file 120.

In this specific example, as shown in FIG. 20, the play list information file 120 stores therein play list comprehensive information 122, a play list pointer table 124, and a play list #n information table 126 (i=1, 2, 3, 4), for each Field type, as the play list information table 121 (refer to FIG. 3).

Each Field may have a structure that allows the necessary number of each table to be added. For example, if there are ten play lists, the relative Field may increase to ten Fields under this structure, and so does the Item information table.

Incidentally, the total number of Items constituting each of the play lists #1 to #4 is 3, 1, 2, and 1, respectively.

Among them, the play list comprehensive information (P list comprehensive information) 122 describes therein the size of the play list table, the total number of play lists, and the like.

The play list pointer table (P list pointer table) 124 describes thereon the storing address of each play list information by each play list pointer (P list #1 pointer to P list #4 pointer).

The play list #1 information table (P list #1 information table) 126 stores therein comprehensive information about the play list #1, the Item information table of the play list #1 (P list Item information table) and the other information. The play list #2 information table 126, the play list #3 information table 126, and the play list #4 information table 126 also store therein the same type of information related to the play lists #2, #3, and #4, respectively.

The "Item information table" stores therein the Item information of the total number of Items constituting one play list. Here, an AU number in the AU (Associate Unit) table written in the "Item #1 (Item #1 information)" or the "Item #2 (Item #2 information)" is the number of the AU, which stores information for specifying the address of the TS object to be used for the Item reproduction, or specifying each elementary stream (i.e. the video stream, the audio stream, or the sub picture stream) in the TS object to be used for the Item reproduction.

In this embodiment, as explained with reference to FIG. 17 to FIG. 20, the title 200 is constructed of one or more title play lists 115. One title play list 115 is constructed of the Pre command 116, the Post command 117, the other logical information and the play list 126 which is a group of Items 204 to be reproduced. In one title #n information, the whole title play lists 115 are stored, and the play list number which is specified by one title play list 115 is the play list number stored in the play list information file 120.

(3) Object Information File:

Next, with reference to FIG. 21, the object information file 130 will be explained in detail using one specific example. FIG. 21 is a schematic diagram showing one specific example of the data structures on the AU table 131 (refer to FIG. 3) constructed in the object information file 130 and on the ES map table 134 (refer to FIG. 3) related to the AU table 131.

In this specific example, as shown in FIG. 21, the object information file 130 stores therein object information tables. The object information tables comprise the AU table 131 shown in the upper part of FIG. 21 and the ES map table 134 shown in the lower part.

In the upper part of FIG. 21, the AU table 131 may have a structure that allows the necessary number of tables for each Field to be added. For example, if there are four AUs, the relative Field may increase to four Fields under this structure.

The AU table 131 stores therein "AU table comprehensive information" in which the number of AUs and the pointer to each AU, and the like are written, and "the other information."

The AU table 131 describes therein the Index number (Index number= . . . ) of the corresponding ES map table 134, as the AU information 132I indicating an ES table Index #m in each PU #m corresponding to each AU #n. Here, the "AU" is a unit corresponding to a "show" in TV broadcast, for example, as mentioned above (especially, in the case of "multi-vision" broadcasting, it is a unit of a group of a plurality of "visions" which are changeable or selectable), and it includes one or more PUs, each of which is a reproduction unit. Moreover, the "PU" is a group of mutually changeable elementary streams which are included in each AU, as described above, and the ES table Index #m corresponding to each PU is specified by the PU information 302I. For example, in the case of constructing multi-view contents with the AU, the AU stores therein a plurality of PUs, and each PU stores therein the pointers to a plurality of elementary stream packet IDs, which indicate the packets constituting the content of each view. This indicates the Index number in the ES map table 134, as described later.

In the lower part of FIG. 21, the ES map table 134 stores therein ES map table comprehensive information, a plurality of Indexes #m (m=1, 2, . . . ), and the "other information", for each Field.

The "ES map table comprehensive information" describes therein the size of the ES map table, the total number of Indexes, and the like.

The "Index #m" includes the elementary stream packet IDs (ES_PIDs) of the entire elementary streams to be used for the reproduction, the corresponding Index numbers, and the address information of the elementary stream.

Constructed as described above, it is possible to obtain the elementary stream packet ID (ES_PID) of the actual elementary stream from the Index number of the ES map 134 specified from the AU table 131. Moreover, since the address information of the elementary stream corresponding to the elementary stream packet ID can be obtained at the same time, it is possible to reproduce the object data on the basis of these information.

As explained in detail with reference to FIG. 1 to FIG. 21, in this embodiment, the number of the play list, which is a group of the Pre command 116, the Post command 117, and the Item 204 to be reproduced, is written in one title play list 115, and this is stored in the disc information file 110. On the other hand, as for the play list itself, it is separately stored in the play list information file 120. Therefore, even in the case of adding a different reproduction condition or a branch condition to the same play list 115, the different title 200 can be logically constructed easily by adding the title #n information in which a new title play list 115 is simply given. In this case, by avoiding the verbose description of the play list 126, it is possible to reduce the data volume of the play list 126 and save the recording capacity on the optical disc 100.

Moreover, these benefits are useful in an authoring operation for a ROM type media preparation and in an edit operation at a recorder for civil use. It is extremely simple to execute an adding operation such as adding any Pre command 116, Post command 117, or reproduction condition after the logical preparation of the play list 126 for the prepared TS object 142, which is extremely useful.

Incidentally, the optical disc 100 as one example of the information recording medium and a recorder or a player related to the optical disc 100 as one example of the information recording/reproducing apparatus are explained in the above described embodiment; however, the present invention is not limited to the optical disc, and the recorder or the player. The present invention is available for the other various information recording/reproducing media corresponding to the high density recording or the high transmission rate, and their recorders or players.

According to this embodiment, as described above in detail, it is possible to efficiently record onto the information recording medium one or a plurality of titles provided with complicated and a large amount of content information that enables the interactive or special reproduction, for example, and to efficiently reproduce a desired one of them relatively easily.

The present invention is not limited to the above-described embodiments, and changes may be made if desired without departing from the scope or spirit of the invention which can be read from the claims and the entire specification. An information recording medium, an apparatus for and a method of recording the information, an apparatus for and a method of reproducing the information, an apparatus for and a method of recording and reproducing the information, a computer program for controlling the record or the reproduction, and a data structure including a control signal that accompany such changes are also intended to be within the technical scope of the present invention.

Industrial Applicability

An information recording medium, a apparatus for and a method of recording the information, an apparatus for and a method of reproducing the information, an apparatus for and a method of recording and reproducing the information, a computer program for controlling the record or the reproduction, and a data structure including a control signal that are associated with the present invention can be applied to a high-density optical disc for consumer or industrial use, such as a DVD, on which various information, such as the video information, the audio information, the sub picture information, and the reproduction control information, can be recorded at high density and further can be applied to a DVD player, a DVD recorder, and the like. Moreover, they can be applied to an information recording medium, an information recording/reproducing apparatus, or the like, which are inserted in or can be connected to various computer equipment for consumer or industrial use, for example.

The invention claimed is:

1. An information recording medium, which can be recorded by an information recording apparatus or which can be reproduced by an information reproducing apparatus, on which one or a plurality of titles, each of which is a logically-grouped information unit, are recorded, said information recording medium comprising:
    an object data file for storing object data which is constructed by a unit of a packet which includes time information for indicating a reproduction process time;
    a play list information file for storing one or more play list information including a plurality of item information which defines a reproduction sequence of the object data by a unit of item;
    an object information file for collectively storing object information which includes information for indicating address of the packet of the object data corresponding to each item; and
    a disc information file for storing a plurality of information groups including, as reproduction control information for controlling the reproduction of said object data file, (i) play list specification information for specifying one play list information stored in said play list information file, (ii) Pre command information which indicates a command to be executed before the reproduction based on the one play list information, and (iii) Post command information which indicates a command to be executed after the reproduction based on the one play list information.

2. The information recording medium according to claim 1, wherein
    said object information further comprising correspondence definition information which defines the correspondence relationship between a plurality of packets to be multiplexed and a plurality of portion streams which are constructed from the plurality of packets as another reproduction control information for controlling the reproduction of said object data file.

3. An information recording apparatus for recording one or a plurality of titles, each of which is a logically-grouped information unit, onto an information recording medium,
    said information recording apparatus comprising:
    a first recording devise for recording an object data file for storing object data which is constructed by a unit of a packet which includes time information for indicating a reproduction process time;
    a second recording device for recording a play list information file for storing one or more play list information including a plurality of item information which defines a reproduction sequence of the object data by a unit of item;
    a third recording device for recording an object information file for collectively storing object information which includes information for indicating address of the packet of the object data corresponding to each item; and
    a fourth recording device for recording a disc information file for storing a plurality of information groups including, as reproduction control information for controlling the reproduction of said object data file, (i) play list specification information for specifying one play list information stored in said play list information file , (ii) Pre command information which indicates a command to be executed before the reproduction based on the one play list information, and (iii) Post command information which indicates a command to be executed after the reproduction based on the one play list information.

4. An information recording method of recording one or a plurality of titles, each of which is a logically-grouped information unit, onto an information recording medium, said information recording method comprising:
a first recording process of recording an object data file for storing object data which is constructed by a unit of a packet which includes time information for indicating a reproduction process time;
a second recording process of recording a play list information file for storing one or more play list information including a plurality of item information which defines a reproduction sequence of the object data by a unit of item;
a third recording process of recording an object information file for collectively storing object information which includes information for indicating address of the packet of the object data corresponding to each item; and
a fourth recording process of recording a disc information file for storing a plurality of information groups including, as reproduction control information for controlling the reproduction of said object data file, (i) play list specification information for specifying one play list information stored in said play list information file, (ii) Pre command information which indicates a command to be executed before the reproduction based on the one play list information, and (iii) Post command information which indicates a command to be executed after the reproduction based on the one play list information.

5. An information reproducing apparatus for reproducing at least one portion of recorded titles from an information recording medium on which one or the plurality of titles, each of which is a logically-grouped information unit, are recorded said information recording medium comprising:
an object data file for storing object data which is constructed by a unit of a packet which includes time information for indicating a reproduction process time;
a play list information file for storing one or more play list information including a plurality of item information which defines a reproduction sequence of the object data by a unit of item;
an object information file for collectively storing object information which includes information for indicating address of the packet of the object data corresponding to each item; and
a disc information file for storing a plurality of information groups including, as reproduction control information for controlling the reproduction of said object data file, (i) play list specification information for specifying one play list information stored in said play list information file, (ii) Pre command information which indicates a command to be executed before the reproduction based on the one play list information, and (iii) Post command information which indicates a command to be executed after the reproduction based on the one play list information,
said information reproducing apparatus comprising:
a reading device for physically reading information from said information recording medium; and
a reproducing device for reproducing the object data included in the information read by said reading device, on the basic of the play list information file, the object information file and the disc information file included in the information read by said reading device.

6. An information reproducing method of reproducing at least one portion of recorded titles from an information recording medium on which one or the plurality of titles, each of which is a logically-grouped information unit, are recorded, said information recording medium comprising:
an object data file for storing object data which is constructed by a unit of a packet which includes time information for indicating a reproduction process time;
a play list information file for storing one or more play list information including a plurality of item information which defines a reproduction sequence of the object data file by a unit of item;
an object information file for collectively storing object information which includes information for indicating address of the packet of the object data corresponding to each item; and
a disc information file for storing a plurality of information groups including, as reproduction control information for controlling the reproduction of said object data file, (i) play list specification information for specifying one play list information stored in said play list information file, (ii) Pre command information which indicates a command to be executed before the reproduction based on the one play list information, and (iii) Post command information which indicates a command to be executed after the reproduction based on the one play list information,
said information reproducing method comprising:
a reading process of physically reading information from said information recording medium; and
a reproducing process of reproducing the object data included in the information read by said reading device, on the basis of the play list information file, the object information file and the disc information file included in the information read by said reading device.

7. A computer program product for controlling record and for tangibly embodying a program of instructions executable by a computer to make the computer function as at least one portion of a first recording device, a second recording device, a third recording device and a fourth recording device,
the computer being provided in an information recording apparatus for recording one or a plurality of titles, each of which is a logically-grouped information unit, onto an information recording medium,
said information recording apparatus comprising:
said first reading device for recording an object data file for storing object data which is constructed by a unit of a packet which includes time information for indicating a reproduction process time;
said second recording device for recording a play list information file for storing one or more play list information including a plurality of item information which defines a reproduction sequence of the object data by a unit of item;
said third recording device for recording an object information file for collectively storing object information which includes information for indicating address of the packet of the object data corresponding to each item; and
said fourth recording device for recording a disc information file for storing a plurality of information groups including, as reproduction control information for controlling the reproduction of said object data file, (i) play list specification information for specifying one play list information stored in said play list information file, (ii)

Pre command information which indicates a command to be executed before the reproduction based on the one play list information, and (iii) Post command information which indicates a command to be executed after the reproduction based on the one play list information.

8. A computer program product for controlling reproduction and for tangibly embodying a program of instructions executable by a computer to make the computer function as at least one portion of a reading device and a reproducing device, the computer being provided in an information reproducing apparatus for reproducing at least one portion of recorded titles from an information recording medium on which one or the plurality of titles, each of which is a logically-grouped information unit, are recorded, said information recording medium comprising:

an object data file for storing object data which is constructed by a unit of a packet which includes time information for indicating a reproduction process time;

a play list information file for storing one or more play list information including a plurality of item information which defines a reproduction sequence of the object data by a unit of item;

an object information file for collectively storing object information which includes information for indicating address of the packet of the object data corresponding to each item; and a disc information file for storing a plurality of information groups including, as reproduction control information for controlling the reproduction of said object data file, (i) play list specification information for specifying one play list information stored in said play list information file, (ii) Pre command information which indicates a command to be executed before the reproduction based on the one play list information, and (iii) Post command information which indicates a command to be executed after the reproduction based on the one play list information, said information reproducing apparatus comprising:

said reading device for physically reading information from said information recording medium; and said reproducing device for reproducing the object data included in the information read by said reading device, on the basis of the play list information file, the object information file and the disc information file included in the information read by said reading device.

* * * * *